US009131047B2

(12) United States Patent  
Roundtree et al.

(10) Patent No.: US 9,131,047 B2  
(45) Date of Patent: *Sep. 8, 2015

(54) LOCAL INTERCEPT METHODS, SUCH AS APPLICATIONS FOR PROVIDING CUSTOMER ASSISTANCE FOR TRAINING, INFORMATION CALLS AND DIAGNOSTICS

(71) Applicant: Nuance Communications, Inc., Burlington, MA (US)

(72) Inventors: Brian Roundtree, Seattle, WA (US); Kevin Allan, Seattle, WA (US); Thomas Trinneer, Bellevue, WA (US)

(73) Assignee: Nuance Communications, Inc., Burlington, MA (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/084,520

(22) Filed: Nov. 19, 2013

(65) Prior Publication Data

US 2014/0080461 A1   Mar. 20, 2014

Related U.S. Application Data

(60) Continuation of application No. 13/613,314, filed on Sep. 13, 2012, now Pat. No. 8,682,301, which is a division of application No. 11/917,323, filed as application No. PCT/US2006/024637 on Jun. 23, 2006, now Pat. No. 8,301,123.

(60) Provisional application No. 60/693,893, filed on Jun. 24, 2005.

(51) Int. Cl.
*H04M 3/00* (2006.01)
*H04M 3/42* (2006.01)
(Continued)

(52) U.S. Cl.
CPC ............ *H04M 3/42136* (2013.01); *G09B 7/02* (2013.01); *H04M 3/42017* (2013.01); *H04W 8/245* (2013.01)

(58) Field of Classification Search
CPC ................... H04L 29/08108; H04L 29/08117; H04L 29/08126; H04L 63/20; H04W 4/00; H04W 4/001; H04W 4/003; H04W 8/205; H04M 1/72519
USPC ........... 455/414.1, 412.1, 415, 418, 419, 425, 455/435.1, 550.1
See application file for complete search history.

(56) References Cited

U.S. PATENT DOCUMENTS 4,730,252 A    3/1988  Bradshaw
4,964,077 A   10/1990  Eisen et al.
(Continued)

FOREIGN PATENT DOCUMENTS

CA    2454334 A1    2/2003
CN    1283341 A     2/2001
(Continued)

OTHER PUBLICATIONS

3rd Generation Partnership Project. "Specification of the SIM Application Toolkit for the Subscriber Identity Module—MobileEquipment (SIM-ME) Interface (Release 1999)," 3GPPOrganizational Partners, 2004, 143 pages.

(Continued)

*Primary Examiner* — Khai M Nguyen
(74) *Attorney, Agent, or Firm* — Perkins Coie LLP

(57) ABSTRACT

A method of displaying a tutorial to a user of a mobile device is disclosed. In some examples, the mobile device receives an input associated with one or more user functions of the mobile device and launches a locally based application in response to the received input. The locally based application may output instructions to the user explaining to the user how to implement the one or more user functions.

20 Claims, 15 Drawing Sheets

(51) Int. Cl.
  *G09B 7/02* (2006.01)
  *H04W 8/24* (2009.01)

(56) References Cited

U.S. PATENT DOCUMENTS

| | | | |
|---|---|---|---|
| 5,422,656 A | 6/1995 | Allard et al. |
| 5,475,735 A | 12/1995 | Williams et al. |
| 5,638,369 A | 6/1997 | Ayerst et al. |
| 5,675,628 A | 10/1997 | Hokkanen |
| 5,790,798 A | 8/1998 | Beckett, II et al. |
| 5,831,598 A | 11/1998 | Kauffert et al. |
| 5,845,211 A | 12/1998 | Roach, Jr. |
| 6,031,467 A | 2/2000 | Hymel et al. |
| 6,151,507 A | 11/2000 | Laiho et al. |
| 6,199,045 B1 | 3/2001 | Giniger et al. |
| 6,219,047 B1 | 4/2001 | Bell |
| 6,245,756 B1 | 6/2001 | Patchev et al. |
| 6,246,756 B1 | 6/2001 | Borland et al. |
| 6,301,480 B1 | 10/2001 | Kennedy, III et al. |
| 6,368,205 B1 | 4/2002 | Frank |
| 6,370,399 B1 | 4/2002 | Phillips |
| 6,389,278 B1 | 5/2002 | Singh |
| 6,424,945 B1 | 7/2002 | Sorsa |
| 6,430,252 B2 | 8/2002 | Reinwand et al. |
| 6,430,407 B1 | 8/2002 | Turtiainen |
| 6,466,783 B2 | 10/2002 | Dahm et al. |
| 6,496,979 B1 | 12/2002 | Chen et al. |
| 6,615,038 B1 | 9/2003 | Moles et al. |
| 6,618,478 B1 | 9/2003 | Stuckman et al. |
| 6,646,570 B1 | 11/2003 | Yamada et al. |
| 6,654,594 B1 | 11/2003 | Hughes et al. |
| 6,668,169 B2 | 12/2003 | Burgan et al. |
| 6,707,915 B1* | 3/2004 | Jobst et al. ............ 380/247 |
| 6,720,864 B1 | 4/2004 | Wong et al. |
| 6,748,211 B1 | 6/2004 | Isaac et al. |
| 6,766,017 B1 | 7/2004 | Yang |
| 6,792,280 B1 | 9/2004 | Hori et al. |
| 6,795,703 B2 | 9/2004 | Takae et al. |
| 6,819,932 B2 | 11/2004 | Allison et al. |
| 6,909,910 B2 | 6/2005 | Pappalardo et al. |
| 6,922,721 B1 | 7/2005 | Minborg et al. |
| 6,931,258 B1 | 8/2005 | Jarnstrom et al. |
| 6,940,844 B2 | 9/2005 | Purkayastha et al. |
| 6,944,447 B2 | 9/2005 | Portman et al. |
| 6,954,754 B2 | 10/2005 | Peng |
| 6,970,698 B2 | 11/2005 | Majmundar et al. |
| 6,978,147 B2 | 12/2005 | Coombes |
| 7,024,199 B1 | 4/2006 | Massie et al. |
| 7,031,697 B2 | 4/2006 | Yang et al. |
| 7,080,321 B2 | 7/2006 | Aleksander et al. |
| 7,092,738 B2 | 8/2006 | Creamer et al. |
| 7,099,288 B1 | 8/2006 | Parker et al. |
| 7,170,993 B2 | 1/2007 | Anderson et al. |
| 7,177,665 B2 | 2/2007 | Ishigaki |
| 7,190,960 B2 | 3/2007 | Wilson et al. |
| 7,194,257 B2 | 3/2007 | House et al. |
| 7,209,964 B2 | 4/2007 | Dugan et al. |
| 7,236,166 B2 | 6/2007 | Zinniel et al. |
| 7,295,836 B2 | 11/2007 | Yach et al. |
| 7,308,497 B2 | 12/2007 | Louviere et al. |
| 7,353,016 B2 | 4/2008 | Roundtree et al. |
| 7,359,706 B2 | 4/2008 | Zhao |
| 7,376,414 B2 | 5/2008 | Engstrom |
| 7,379,969 B2 | 5/2008 | Osborn, Jr. |
| 7,493,381 B2 | 2/2009 | Garg |
| 7,539,484 B2 | 5/2009 | Roundtree |
| 7,558,965 B2 | 7/2009 | Wheeler et al. |
| 7,647,075 B2 | 1/2010 | Tsuda et al. |
| 7,647,527 B2 | 1/2010 | Duan et al. |
| 7,660,870 B2 | 2/2010 | Vandermeijden et al. |
| 7,676,221 B2 | 3/2010 | Roundtree et al. |
| 7,725,072 B2 | 5/2010 | Bettis et al. |
| 7,735,021 B2 | 6/2010 | Padawer et al. |
| 7,756,545 B2 | 7/2010 | Roundtree |
| 7,773,982 B2 | 8/2010 | Bishop et al. |
| 7,783,729 B1 | 8/2010 | Macaluso |
| 7,809,376 B2 | 10/2010 | Letourneau et al. |
| 7,881,703 B2 | 2/2011 | Roundtree et al. |
| 7,899,915 B2 | 3/2011 | Reisman |
| 8,036,645 B2 | 10/2011 | Roundtree et al. |
| 8,285,263 B2 | 10/2012 | Roundtree et al. |
| 8,301,123 B2 | 10/2012 | Roundtree et al. |
| 8,682,301 B2* | 3/2014 | Roundtree et al. ......... 455/414.1 |
| 2001/0046886 A1 | 11/2001 | Ishigaki |
| 2002/0055793 A1 | 5/2002 | Yoshioka |
| 2002/0065109 A1 | 5/2002 | Mansikkaniemi et al. |
| 2002/0112172 A1 | 8/2002 | Simmons |
| 2002/0115476 A1 | 8/2002 | Padawer et al. |
| 2002/0123368 A1 | 9/2002 | Yamadera et al. |
| 2002/0155476 A1 | 10/2002 | Pourmand et al. |
| 2003/0013483 A1 | 1/2003 | Ausems et al. |
| 2003/0039948 A1 | 2/2003 | Donahue |
| 2003/0112931 A1 | 6/2003 | Brown et al. |
| 2003/0187650 A1 | 10/2003 | Moore et al. |
| 2003/0192029 A1* | 10/2003 | Hughes .................... 717/101 |
| 2003/0204725 A1 | 10/2003 | Itoi et al. |
| 2003/0233461 A1 | 12/2003 | Mariblanca-Nieves et al. |
| 2004/0095372 A1 | 5/2004 | Berry et al. |
| 2004/0123153 A1* | 6/2004 | Wright et al. ............... 713/201 |
| 2004/0142720 A1 | 7/2004 | Smethers |
| 2004/0171375 A1 | 9/2004 | Chow-Toun |
| 2004/0172561 A1 | 9/2004 | Iga |
| 2004/0193444 A1 | 9/2004 | Hufford et al. |
| 2004/0198316 A1 | 10/2004 | Johnson |
| 2004/0224710 A1 | 11/2004 | Koskelainen et al. |
| 2004/0242209 A1 | 12/2004 | Kruis et al. |
| 2005/0003850 A1 | 1/2005 | Tsuda et al. |
| 2005/0108329 A1 | 5/2005 | Weaver et al. |
| 2005/0120345 A1 | 6/2005 | Carson |
| 2005/0164692 A1* | 7/2005 | Roth et al. .................... 455/419 |
| 2005/0233733 A1 | 10/2005 | Roundtree et al. |
| 2005/0266798 A1 | 12/2005 | Moloney et al. |
| 2006/0003758 A1 | 1/2006 | Bishop et al. |
| 2006/0047830 A1 | 3/2006 | Nair et al. |
| 2006/0158436 A1 | 7/2006 | LaPointe et al. |
| 2006/0168303 A1 | 7/2006 | Oyama et al. |
| 2006/0229054 A1 | 10/2006 | Erola et al. |
| 2006/0245391 A1 | 11/2006 | Vaidya et al. |
| 2006/0274869 A1 | 12/2006 | Morse |
| 2007/0019563 A1 | 1/2007 | Ramachandran et al. |
| 2007/0037573 A1 | 2/2007 | Kyung et al. |
| 2007/0061243 A1 | 3/2007 | Ramer et al. |
| 2007/0064743 A1 | 3/2007 | Bettis et al. |
| 2007/0155411 A1 | 7/2007 | Morrison |
| 2007/0189275 A1 | 8/2007 | Neff |
| 2007/0293199 A1 | 12/2007 | Roundtree et al. |
| 2007/0293200 A1 | 12/2007 | Roundtree et al. |
| 2008/0039056 A1 | 2/2008 | Mathews et al. |
| 2008/0189550 A1 | 8/2008 | Roundtree |
| 2008/0194296 A1 | 8/2008 | Roundtree |
| 2008/0256447 A1 | 10/2008 | Roundtree et al. |
| 2008/0280588 A1 | 11/2008 | Roundtree et al. |
| 2009/0124271 A1 | 5/2009 | Roundtree et al. |
| 2009/0254912 A1 | 10/2009 | Roundtree et al. |
| 2010/0056114 A1 | 3/2010 | Roundtree et al. |
| 2010/0087175 A1 | 4/2010 | Roundtree |
| 2010/0093396 A1 | 4/2010 | Roundtree |
| 2010/0112997 A1 | 5/2010 | Roundtree |
| 2010/0144325 A1 | 6/2010 | Roundtree et al. |
| 2010/0159902 A1* | 6/2010 | Roundtree et al. ......... 455/414.1 |
| 2010/0169443 A1 | 7/2010 | Roundtree et al. |
| 2010/0279669 A1 | 11/2010 | Roundtree |
| 2011/0117894 A1 | 5/2011 | Roundtree et al. |
| 2012/0028620 A1 | 2/2012 | Roundtree et al. |
| 2012/0210166 A1* | 8/2012 | Bonefas et al. ............... 714/18 |
| 2013/0005312 A1 | 1/2013 | Roundtree et al. |

FOREIGN PATENT DOCUMENTS

| | | |
|---|---|---|
| CN | 2478292 | 2/2002 |
| CN | 1361995 A | 7/2002 |
| CN | 1611087 A | 4/2005 |
| EP | 1387241 A2 | 2/2004 |
| EP | 1538855 A2 | 6/2005 |

(56) References Cited

FOREIGN PATENT DOCUMENTS

| | | |
|---|---|---|
| GB | 2340344 A | 2/2000 |
| GB | 2365711 A | 2/2002 |
| JP | 62072058 A | 4/1987 |
| JP | 07203536 A | 8/1995 |
| JP | 08166945 | 6/1996 |
| JP | 09-507986 T | 8/1997 |
| JP | 10084404 A | 3/1998 |
| JP | 11-195062 A | 7/1999 |
| JP | 11259199 A | 9/1999 |
| JP | 2000348022 A | 12/2000 |
| JP | 2001069204 A | 3/2001 |
| JP | 2002-135848 A | 5/2002 |
| JP | 200305880 | 1/2003 |
| JP | 2003067334 A | 3/2003 |
| JP | 2003108182 A | 4/2003 |
| JP | 2003-188982 A | 7/2003 |
| JP | 2003186590 A | 7/2003 |
| JP | 2003-280803 A | 10/2003 |
| JP | 2003-303172 A | 10/2003 |
| JP | 2003-308148 A | 10/2003 |
| JP | 2003-309880 A | 10/2003 |
| JP | 2004021580 A | 1/2004 |
| JP | 2004032056 A | 1/2004 |
| JP | 2004-048790 A | 2/2004 |
| JP | 2004364122 A | 12/2004 |
| JP | 2005110063 A | 4/2005 |
| JP | 2005167463 A | 6/2005 |
| KR | 200344337 | 6/2003 |
| WO | WO-9707641 | 2/1997 |
| WO | WO-0070888 A2 | 11/2000 |
| WO | WO-0186472 A1 | 11/2001 |
| WO | 03010985 A1 | 2/2003 |
| WO | WO-2005081852 A2 | 9/2005 |
| WO | WO-2005083996 A1 | 9/2005 |
| WO | WO-2007002499 A2 | 1/2007 |
| WO | WO-2007044972 A2 | 4/2007 |
| WO | WO-2007070837 A2 | 6/2007 |
| WO | WO-2007092908 A2 | 8/2007 |
| WO | WO-2008042989 A2 | 4/2008 |
| WO | WO-2008086320 A1 | 7/2008 |
| WO | WO-2008128119 A1 | 10/2008 |

OTHER PUBLICATIONS

Center for Customer Driven Quality at Purdue University, "It's the Solution, Stupid," 2004, 2 pages.
European Search Report for European Application No. 05713762.2, dated Jun. 27, 2008, Applicant SNAPin Software Inc., 6 pages.
Exam Report for Canadian Application No. 2,556,773, Mail Date Dec. 5, 2011, 2 pages.
Extended European Search Report for European Application No. 12005720.3, Dated Dec. 20, 2012, 6 pages.
Extended European Search Report for European Application No. 12005720.3, Dated Dec. 12, 2012, 5 pages.
Gartner, "Contact Center Investment Strategy and Leading Edge technologies,"http://www.gartner.com/4_decision_tools/measurement/measure_it_articles/2002_12/contact_center_investment_strategy_jsp, accessed on Jul. 8, 2008, 4 pages.
International Search Report for International Application No. PCT/US06/40398, dated Jul. 15, 2008, Applicant SNAPin Software Inc.
International Search Report for International Application No. PCT/US08/60137, dated Jun. 30, 2008, Applicant SNAPinSoftware Inc, 8 pages.
International Search Report of International Application No. PCT/US05/05135, dated Oct. 26, 2005, 3 pages.
International Search Report of International Application No. PCT/US05/33973, dated Apr. 19, 2006, 1 page.
International Search Report of International Application No. PCT/US05/5517, dated Jul. 6, 2005, 5 pages.
International Search Report of International Application No. PCT/US06/24637, dated Aug. 1, 2007, 8 pages.
International Search Report of International Application No. PCT/US07/61806, dated Feb. 13, 2008, 10 pages.
International Search Report of International Application No. PCT/US08/50447, dated Apr. 10, 2008, 3 pages.
SNAPin Software Inc., "SNAPin White Paper: The Service Experience Opportunity," <http://www.snapin.com>, 2005, 16 pages.
Supplementary European Search Report for European Patent Application No. 05723446, Mail Date Jan. 8, 2008, 6 pages.
Supplementary European Search Report for European Patent Application No. 06840247.8, Mail Date Feb. 2, 2012, 8 pages.
Supplementary European Search Report for European Patent Application No. 06785506.4, mailing date Jul. 24, 2014, 10 pages.

* cited by examiner

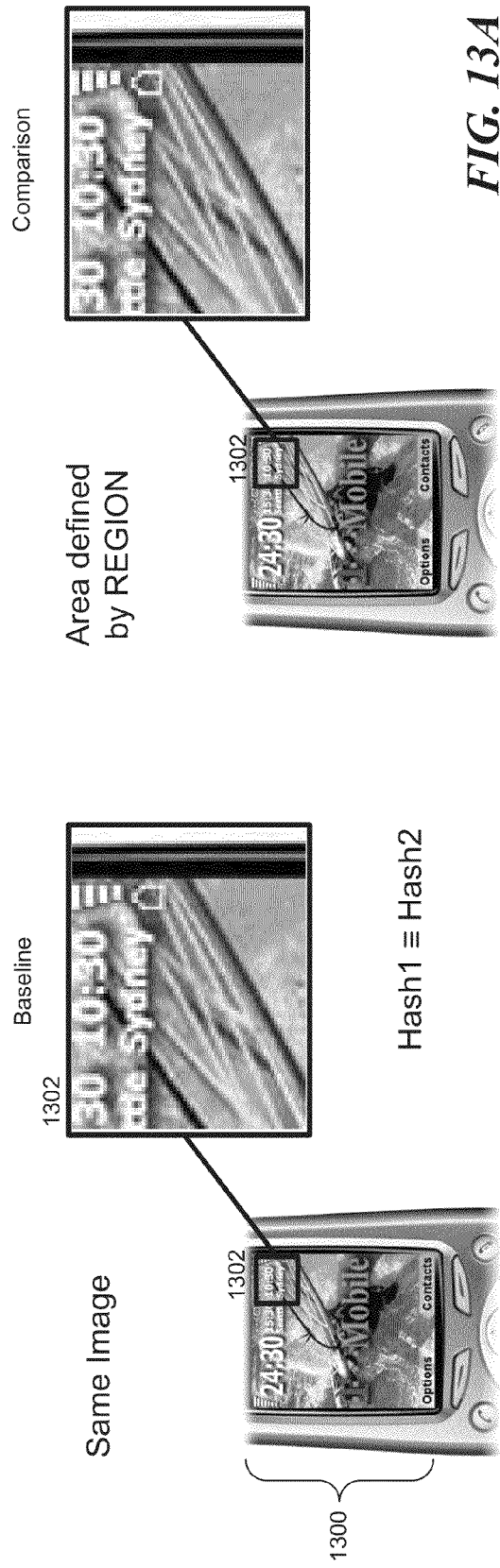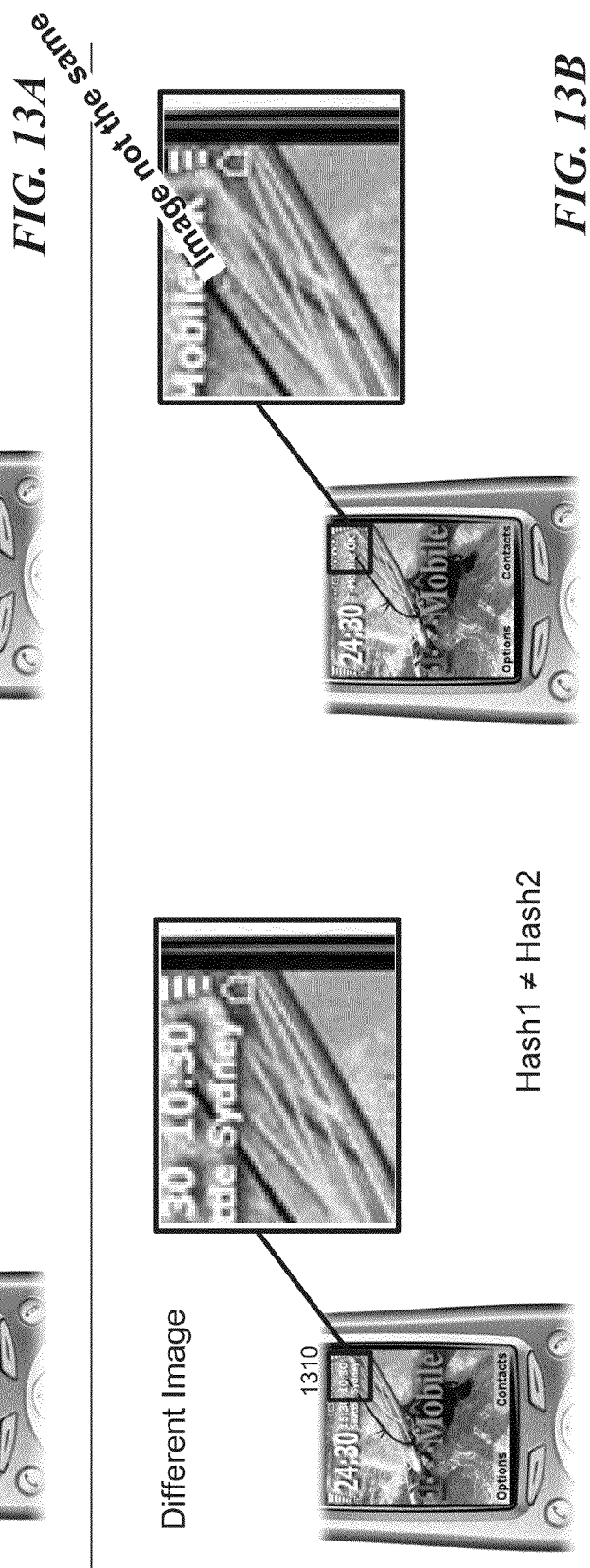

LOCAL INTERCEPT METHODS, SUCH AS APPLICATIONS FOR PROVIDING CUSTOMER ASSISTANCE FOR TRAINING, INFORMATION CALLS AND DIAGNOSTICS

CROSS-REFERENCE TO RELATED APPLICATIONS

This application is a continuation of U.S. patent application Ser. No. 13/613,314, filed Sep. 13, 2012, now issued U.S. Pat. No. 8,682,301, which is a divisional of U.S. patent application Ser. No. 11/917,323, filed on Oct. 13, 2009, now issued U.S. Pat. No. 8,301,123, entitled LOCAL INTERCEPT METHODS, SUCH AS APPLICATIONS FOR PROVIDING CUSTOMER ASSISTANCE FOR TRAINING, INFORMATION CALLS AND DIAGNOSTICS, which is a U.S. national phase application of PCT Patent Application No. US2006/024637, filed Jun. 23, 2006, entitled LOCAL INTERCEPT METHODS, SUCH AS APPLICATIONS FOR PROVIDING CUSTOMER ASSISTANCE FOR TRAINING, INFORMATION CALLS AND DIAGNOSTICS which claims priority to U.S. Provisional Patent Application No. 60/693,893, filed on Jun. 24, 2005, entitled MOBILE DEVICE APPLICATIONS FOR PROVIDING CUSTOMER ASSISTANCE AND OTHER FUNCTIONALITY.

This application is related to PCT Patent Application No. US2005/005135, filed Feb. 18, 2005, entitled CALL INTERCEPT METHODS, SUCH AS FOR CUSTOMER SELF-SUPPORT ON A MOBILE DEVICE, PCT Patent Application No. US05/05517, filed Feb. 18, 2005, entitled MOBILE DEVICE ASSISTANCE, MOBILE DEVICE MANAGEMENT, AND CALL INTERCEPTOR FOR MOBILE DEVICES, and POT Patent Application No. US2005/033973, filed Sep. 21, 2005, entitled SECURE MOBILE DEVICE SOFTWARE EXECUTION, HELP-SUPPORT-CARE INITIATION FOR MOBILE DEVICES, AND SMART NETWORK CONFIGURATION SELECTOR FOR MOBILE DEVICES.

BACKGROUND

Current methods for assisting customers at a mobile device often require a call to a call center and retrieval of data from a network. For example, a subscriber may dial an information number from their mobile device, such as "411." Once the subscriber dials the number, an automated system may answer the call (or an operator) and provide the subscriber with a menu of options. The subscriber selects options from the menu by pressing buttons on the mobile device or through voice recognition software. Once the subscriber requests data by selecting an option, the automated system retrieves the data from a network and delivers the data to the subscriber over the mobile device.

Problems are associated with current implementations of customer assistance for mobile devices. Many existing systems rely on the use of an external network. In provide data to the subscriber. The use of an external network for customer self-support can consume a large amount of bandwidth, congest the network, provide for slower customer response times, and lead to increased costs for the mobile device carrier. In addition, the use of an automated system with multiple options can result in longer call wait times, increased call costs for the mobile carrier and customer, and lost customers due to the longer call wait times.

These and other problems exist with respect to assisting customers of wireless devices.

BRIEF DESCRIPTION OF THE DRAWINGS

FIGS. 13A and 13B show a method for efficient digital comparison of visually displayed information.

Figure 1:
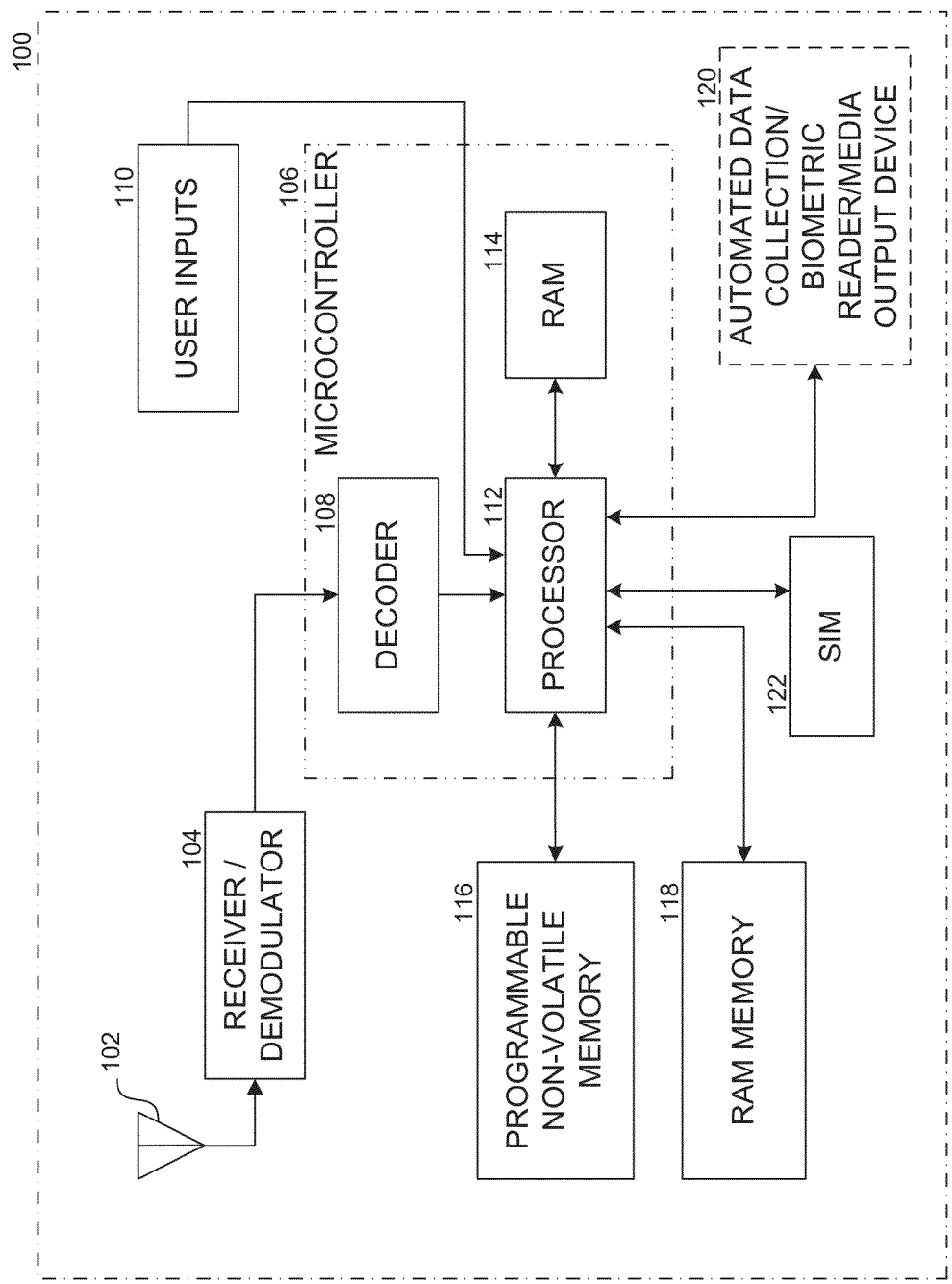
FIG. 1 is a schematic diagram illustrating a mobile device on which call intercept methods can be implemented.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 1104 is first introduced and discussed with respect to FIG. 11).

A portion of this disclosure contains material to which a claim for copyright is made. The copyright owner has no objection to the facsimile reproduction by anyone of the patent document or patent disclosure (including the Figures) as it appears in the Patent and Trademark Office patent file or records, but the copyright owner reserves all other copyright rights whatsoever.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented below be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

A method for locally intercepting calls from a mobile device for providing enhanced services such as customer self-support is disclosed. Subscribers may dial one or more predetermined numbers on their respective mobile device. Software on the mobile device determines whether the number corresponds to one of the predetermined numbers (such as an information number). The phone provides information to the subscriber, and may intercept the call when the number is dialed, after the call has gone through, while the call is on hold, etc. For example, if the number dialed matches an information number, then the mobile device may interrupt the attempted call and display a list of possible solutions that address the subscriber's needs on the mobile device.

Additionally, if the number dialed matches a predetermined number, then the mobile device may display a list of solutions during the call that may address the subscriber's needs on the mobile device. For example, during an information call or a call to a user's voicemail, the system may display information related to the call, or may display paths to related information for the user to choose.

The list of potential solutions may be stored locally on the mobile device itself and not on the network. Each solution can be a combination of step by step procedures for the subscriber to perform, information and graphics, multiple executables that access and alter data on the phone, multiple executables that access and alter data on the carrier network or on a remote Internet server, or others.

Other interceptions may lead to the system providing assistance to a user. The system may determine an event (such as the phone taking a picture) on the mobile device and provide assistance with respect to the event.

Locally stored software or scripts may also assist in diagnosing problems with other equipment. For example, if customer premises equipment is unable to connect to a network to allow diagnostics to be performed, the mobile device can build the needed connection instead.

FIG. 1 illustrates a mobile device 100 on which intercept methods, such as call intercept methods, can be implemented in accordance with several embodiments of the invention. A receiver/demodulator 104 receives a transmitted signal via an antenna 102 and reconstructs the original transmitted signal. The transmitted signal is sent to a microcontroller 106, which consists of a decoder 108, a processor 112, and RAM (Random Access Memory) 114. The decoder 108 translates the signals into meaningful data and interfaces to other devices. Decoded data, along with subscriber inputs 110, are sent to the processor 112. In addition, the mobile device may include optional components, such as an automated data collection 120 unit linked to the processor 112, which can include an automated RFID (Radio Frequency Identification) tag reader, a magnetic card swipe reader, a bar code reader, and others. Additionally, or alternatively, the mobile device may include a biometric reader (e.g., thumbprint reader, voice fingerprint recognition functionality, etc.), and/or a media output device (e.g., MP3 player, television tuner/player, etc.) 120. The mobile device may also include a subscriber identity module (SIM) 122. The output of the processor 112 can be stored in a programmable non-volatile memory 116 or in the RAM memory 118.

Additionally, the subscriber identity module, or SIM card, may contain any or all of the processing components, memory components or storage components described herein. To that end, the device may perform SIM card based processing, memory, or storage.

Figure 2:
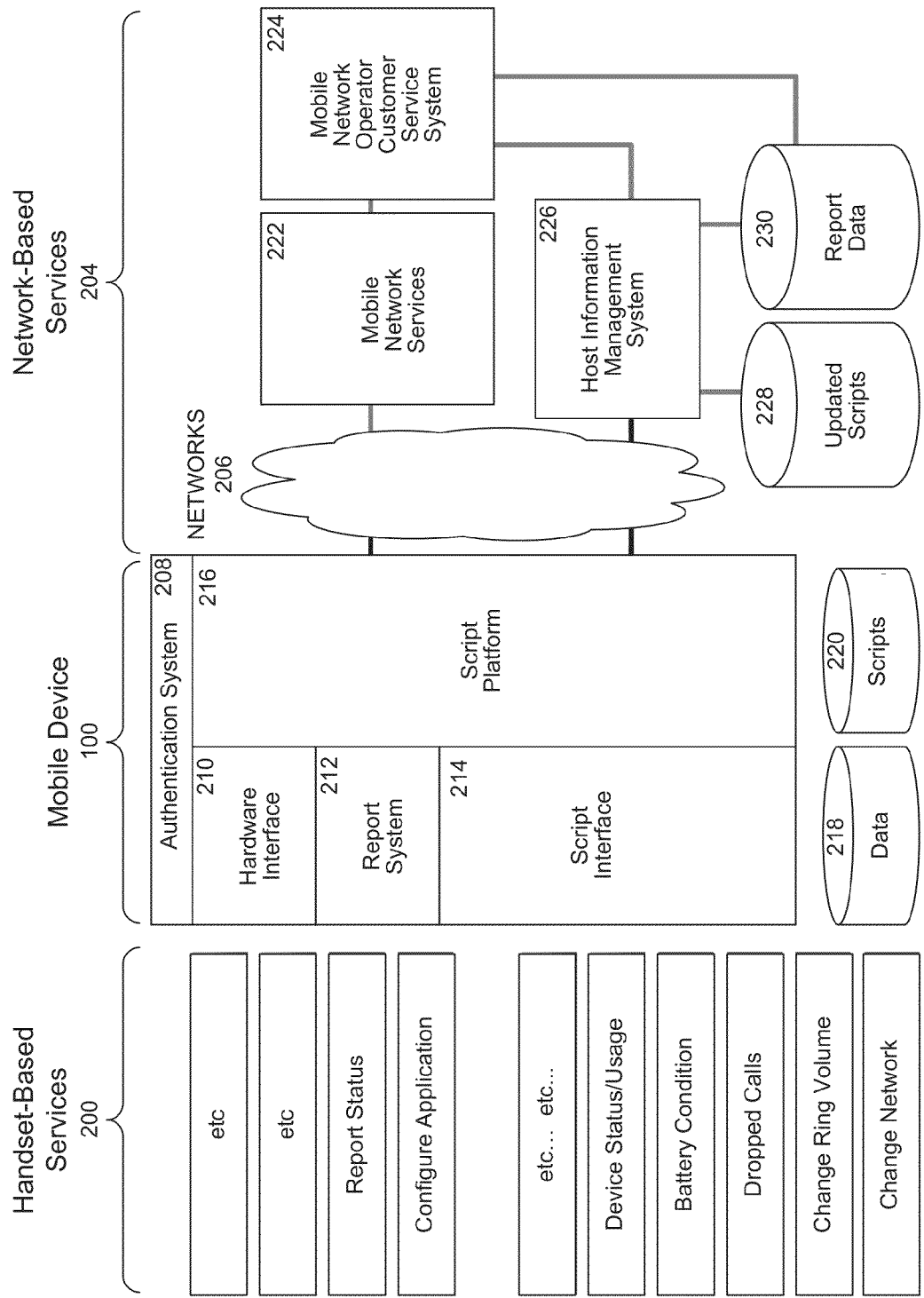
FIG. 2 is a schematic diagram illustrating a system architecture for implementing call intercept methods.

FIG. 2 illustrates a system architecture for implementing intercept methods. The system architecture includes three components: handset-based services 200, the mobile device 100, and network-based services 204. FIG. 1 and the discussion herein provide a brief, general description of a suitable telecommunications or computing environment in which the invention can be implemented. Although not required, aspects of the invention are described in the general context of computer-executable instructions, such as routines executed by a general-purpose computer, e.g., mobile device, a server computer, or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the invention can be embodied in a special purpose computing device or data processor that is specifically programmed, configured, or constructed to perform one or more of the computer-executable instructions explained in detail herein. Aspects of the invention may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hardwired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network. In an alternative embodiment, the mobile device or portable device may represent the server portion, while the server may represent the client portion.

The handset-based services 200 may include executable software, software configurations, hardware configurations and controls, and handset operating system interfaces. As disclosed herein, executable software may include, without limitation, any software program stored on the mobile device or associated memory device, both permanently and temporarily connected via hardware or wireless connectivity. The mobile device 100 may include an authentication system 208 (e.g., via a SIM), a hardware interface 210, a report system 212, a script interface 214, a script platform 216, data 218, and scripts 220. The network-based services 204 may include a network or networks 206, mobile network services 222, a mobile network operator customer service system 224, a host information management system 226, updated scripts 228, and report data 230. The components of the mobile device 100 and the network-based services 204 will be described below.

The components within the mobile device 100 allow the device to integrate both handset-based services 200 and network-based services 204. The authentication system 208 can implement SIM (Subscriber Identity Module) card-based or standalone authentication to meet network requirements for desired levels of security. Authenticating a system to meet network requirements may not be required but is often recommended.

The hardware interface 210 may retrieve hardware interface elements required for interfacing with network or phone-based customer support services. Examples of hardware interface elements include changing volume, changing frequency, retrieving SIM (Subscriber Identity Module) ID, connection status from the SIM or radio hardware, and others. The report system 212 may collect and forward the data reported by the mobile device to the network 206. The report system 212 can also encrypt the handset identification information to provide increased security. The information can be encoded so that only the host information management system 226 can decipher the handset identification information.

The script interface 214 serves as a standard application programming interface for customer support services. More specifically, the script interface 214 provides an interface between scripts 220 and the various hardware-specific and executable, program-specific functions. The script interface 214 allows a single customer service script to be deployed across multiple operating systems and hardware configurations. In addition, the script interface 214 includes a standard API (Application Programming Interface) for both the hardware/OS side and the script interface.

The script platform 216 can mix and match calls through the script interface to acquire information, to change or correct settings on the phone, and to perform additional functions as described below. The script platform 216 authenticates, runs, and updates all scripts 220, manages reporting updates and changes, communicates with the host information management system 226, communicates with the GUI (Graphical User Interface), and manages customer surveys and interviews. The host information management system 226 can push a notification to the script platform 216 via USSD (Unstructured Supplementary Services Data), SMS (Short Message Service), IP (Internet Protocol), or any other network connectivity that the mobile device supports. The script platform 216 can run the scripts 220 after authentication, and the scripts 220 can be authenticated to the network 206 or to the phone.

The components within the network-based services 204 allow the mobile device 100 to communicate with and to retrieve data from the network 206. The network-based services 204 may include wired and wireless systems. The mobile network services 222 may consist of one or more systems including billing, CRM (Customer Relationship Management), provisioning, and others. Furthermore, mobile network services 222 are able to return data calls made by mobile devices via standard network protocols (e.g., IP, DTMF (Dual-Tone Multi-Frequency), SMS, USSD, etc.).

The mobile network operator customer service system 224 may also consist of one or more systems relating to customer service, including billing, CRM, provisioning, and others. The host information management system 226 controls interactions between the mobile device and the host customer support system. The host information management system 226 can transmit updates to the mobile device. The mobile device typically employs a unique handset ID or serial number, and a mobile phone number. The report data 230 provides storage for report information gathered from the mobile device. The updated scripts 228 consist of scripts that the host customer support system provides to the mobile device. The updated scripts 228 can be managed and versioned as desired by the host information management system 226, can be targeted at specific subscribers or groups of subscribers, and can include requests for reports and customer interview surveys.

Figure 3:
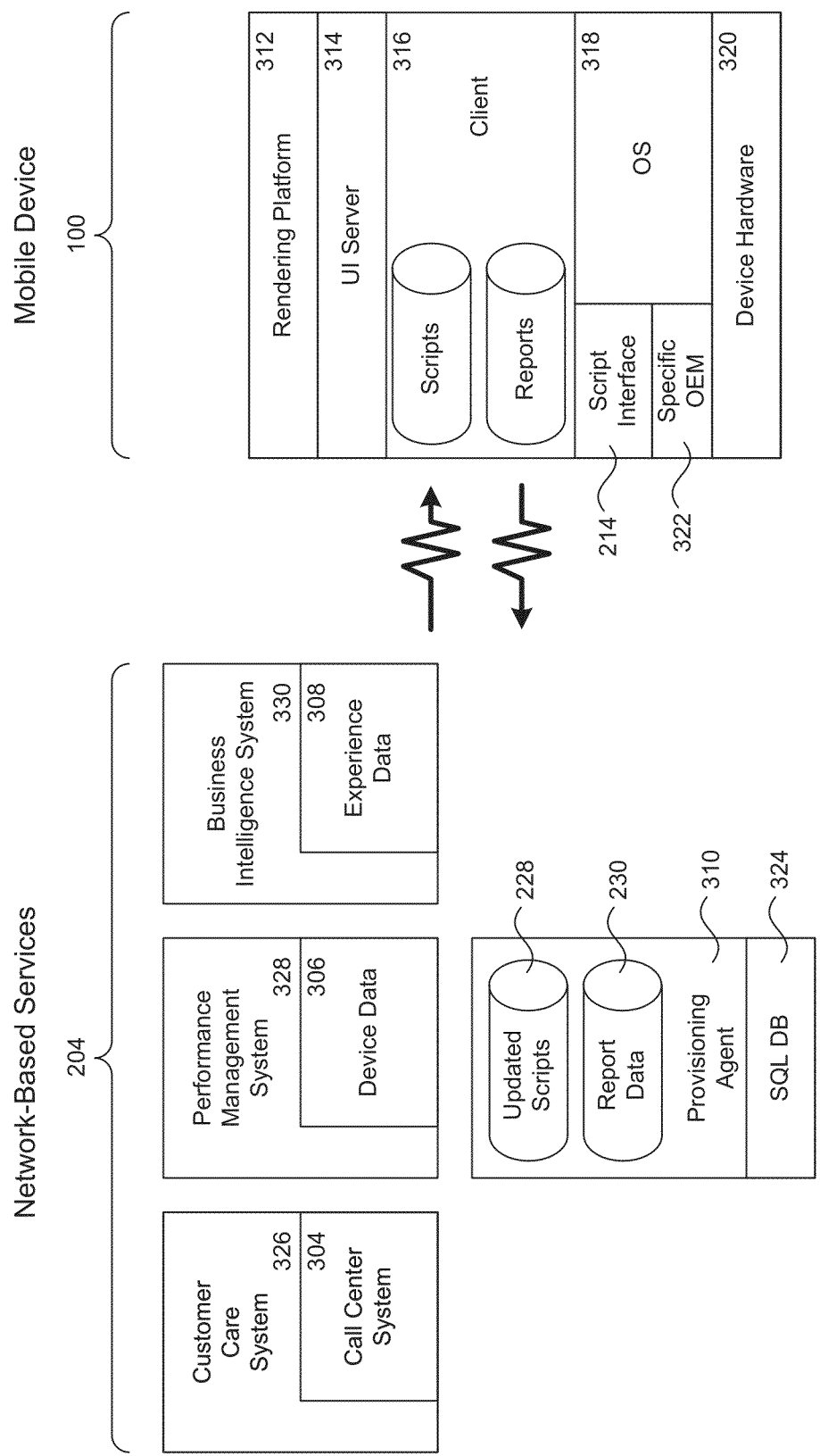
FIG. 3 is a schematic diagram illustrating a system architecture for the network-based services and the mobile device of FIG. 2.

FIG. 3 illustrates a system architecture for the network-based services 204 and the mobile device 100. The network-based services 204 include a call center system 304, device data 306, subscriber experience data 308, and a provisioning agent 310. The call center system 304 may be part of a customer care system 326, the device data 306 may be part of a performance management system 328, and the subscriber experience data 308 may be part of a business intelligence system 330. The call center system 304 can manage settings remotely and can collect data OTA (over the air) from the mobile device 100 without asking the subscriber for permission. The call center system 304 can also automatically collect device data (e.g., handset ID and mobile phone number) 306 and subscriber experience data (e.g., the nature of the customer service problems) 308 from the mobile device 100. The device data 306 and the subscriber experience data 308 may be integrated into network-based services or used standalone.

The provisioning agent 310 interacts with the updated scripts 228 and report data 230. The provisioning agent collects report data 230 associated with the device data 306 and subscriber experience data 308 from the mobile device 100. The provisioning agent also corrects subscriber problems in real-time by transmitting appropriate scripts to the mobile device 100. The transmission of scripts to, and the collection of data from, the mobile device 100 may be hosted within the network or externally. In addition, the updated scripts 228 and the report data 306 may be stored in an SQL (Structured Query Language) database 324.

The mobile device 100 may include a rendering platform 312 (e.g., implemented in C++), an optional UI (User Interface) server 314, a client 316, and a script interface 214. The client 316 generates reports containing subscriber data and transmits the reports to the network-based services 204. The client 316 receives scripts 320 from the network-based services 204 that can correct subscriber problems. The script interface 214 allows a single script to be executed by multiple operating systems and hardware configurations. In addition, the mobile device 100 may also include an OS (Operating System) 318, specific OEM (Original Equipment Manufacturer) 322, and device hardware 320. In general, the mobile device scripts or applications may be customized via a European Computer Manufacture's Association (ECMA) compliant scripting language such as JavaScript. Such software can be installed by the manufacturer, or after manufacturing, such as over the air, particularly with open OS-based devices. For proprietary OS-based devices, a small kernel can be installed at the time of manufacturing or flashed onto the device at a later time, and then the full client application can be installed on the mobile device over the air.

As explained herein, the scripts or software applications on the mobile device provide for at least the following processes: providing customer care to a subscriber on the mobile device by intercepting calls; diagnostic tools to allow customer service representatives to remotely execute diagnostics and commands on the mobile device or to facilitate diagnostics with other equipment, with proactive tool to correct problems for subscribers on the mobile device; collecting and summarizing data and other metrics with respect to mobile devices; and, guides to train subscribers when they need it most, such as the first time they attempt to use an application.

Figure 4:
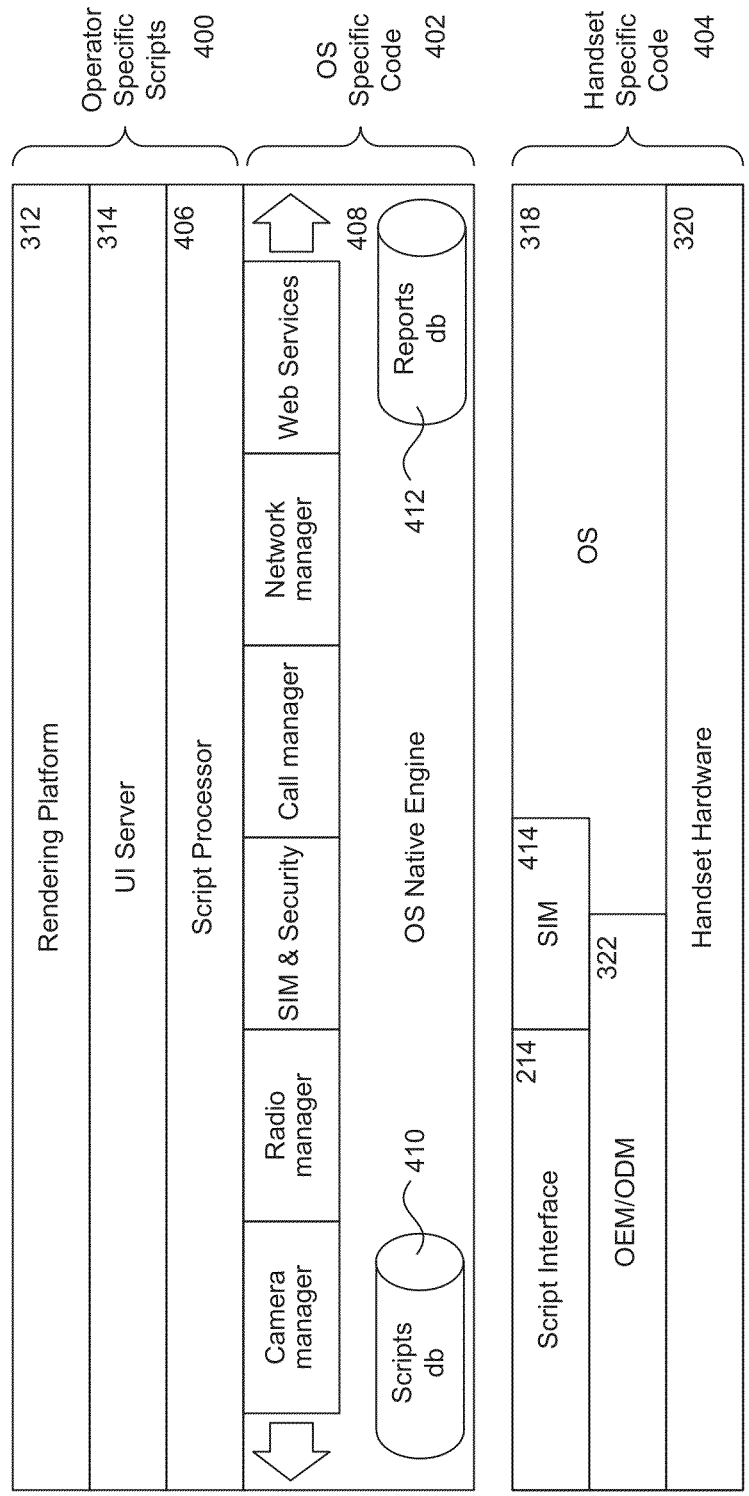
FIG. 4 is a schematic diagram illustrating the architecture for the mobile device of FIG. 1.

FIG. 4 illustrates the architecture for the mobile device 100. The rendering platform 312, the UI server 314, and a script processor 406 handle or are involved in handling operator specific scripts 400. Operator specific scripts 400 may include scripts pertaining to billing information, bill payment, forwarding calls, setting up an online photo album, and others, including those specific to a wireless service provider (such as those providing a preferred user interface). The OS native engine 408, which includes a scripts database 410 and a reports database 412, utilizes OS specific code 402. The script interface 214 utilizes handset specific code 404. Handset specific code 404 may also be applied to a SIM 414, an OS 318, specific OEM 322, and handset hardware 320.

Figure 5:
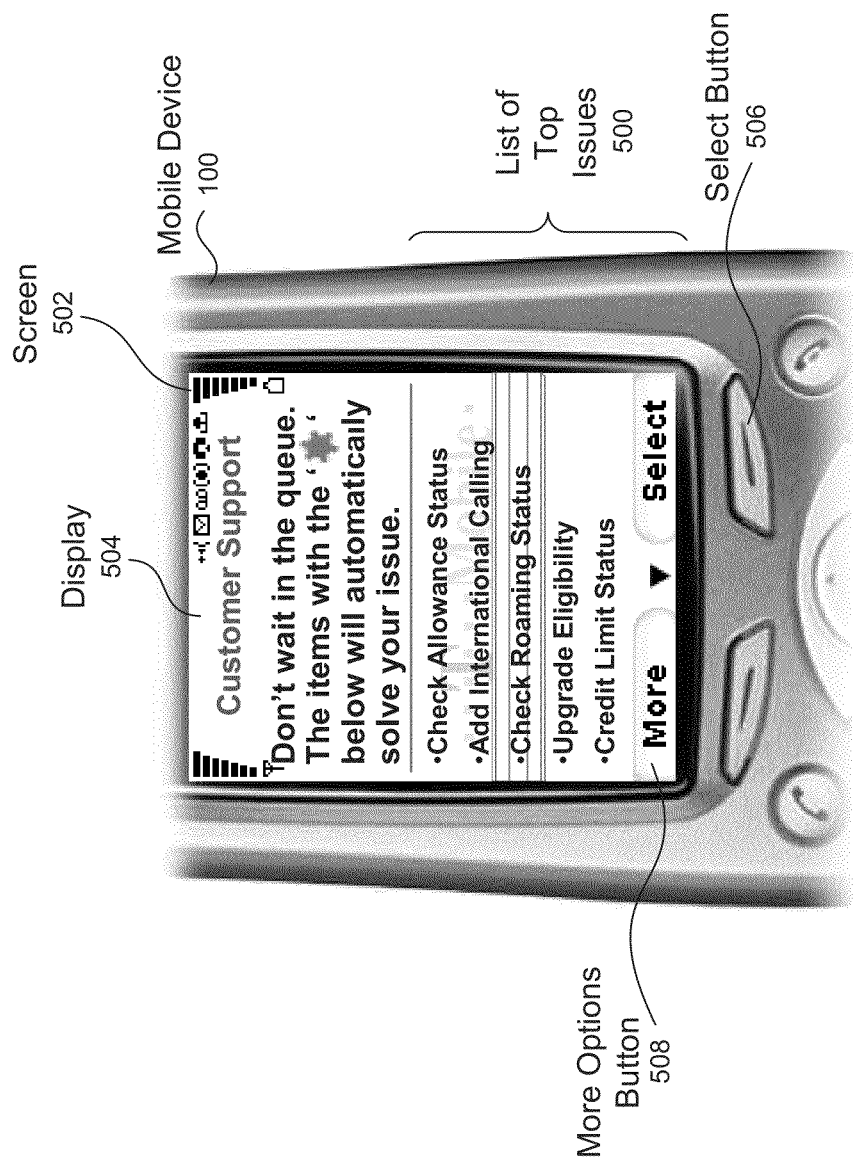
FIG. 5 is a diagram illustrating an example of a display on the mobile device for locally providing customer support.

FIG. 5 illustrates a display 504 on the mobile device 100 for locally providing customer support. Referring to FIG. 5 (and other screen displays), representative phone or computer displays, or web pages, are shown for performing certain tasks described herein. The screens provide facilities to receive input data, such as a form with field(s) to be filled in, menu selections, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page" and "page" are generally used interchangeably herein.

The screens may be stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), Flash format, or matrix or bit-mapped formats.

A subscriber may access the display 504 on a screen 502 by dialing a support number, such as their mobile carrier's support number. The display 504 automatically provides the subscriber with a list of top issues or questions 500, which may answer common customer support questions. Subscribers can scroll down on the display 504 using a more options button 508 to view additional issues. Subscribers can select an issue from the list using a select button 506. Selecting an issue allows the mobile device 100 to retrieve relevant data from the local, programmable non-volatile memory 116.

Figure 6A:
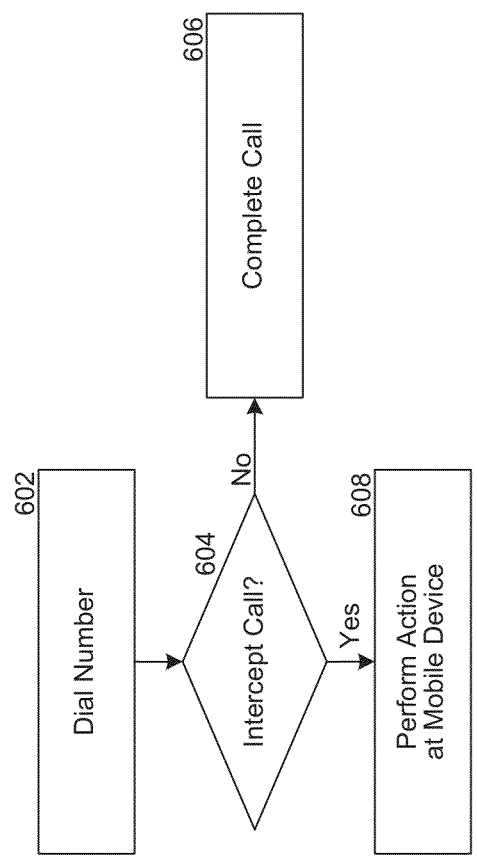
FIG. 6A is a flow diagram illustrating a basic routine for intercepting and redirecting an information call at the mobile device.

FIG. 6A illustrates the basic routine for intercepting and redirecting a support call at the mobile device. In block 602, a subscriber dials a support number, such as information support number "411." The subscriber's mobile device determines locally if the number dialed matches a number stored on the mobile device (block 604). If the number matches, then the mobile device locally intercepts the support call at the mobile device and performs actions at the mobile device (block 608), as described below. In one embodiment, the mobile device may intercept the incoming call and display locally stored content (e.g., series of help screens), or launch a browser to a predetermined webpage via a network connection. If the number does not match, then the mobile device allows the call to be completed to the dialed number (block 606).

Figure 6B:
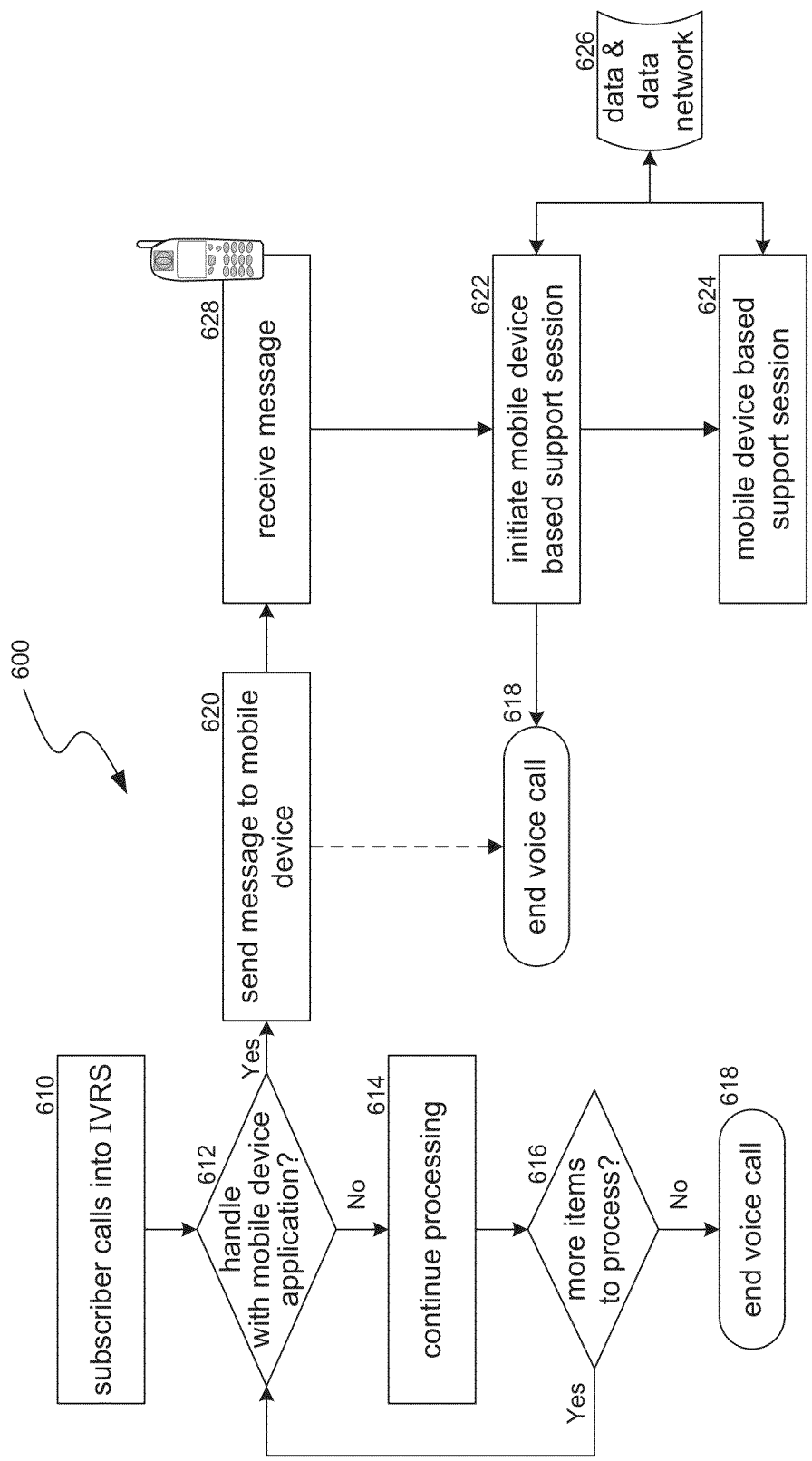
FIG. 6B is a flow diagram illustrating a detailed routine for intercepting and redirecting an information call at the mobile device.

FIG. 6B illustrates a detailed routine 600 for intercepting and redirecting a support call at the mobile device 100. In block 610, a subscriber dials a support number to access a support center. The mobile device 100 determines if the subscriber's call should be locally intercepted and redirected to a mobile device application running on the mobile device or allowed to continue without redirection (block 612). (Alternatively, as described below, the call may be routed to the support call center or an interactive voice response system (IVRS), and then bounced back to the mobile device.) The mobile device 100 determines if the number dialed matches a number stored locally in a table. If the number matches, then the call is intercepted. If the subscriber's call is allowed to continue without redirection (block 614), then the call center determines whether more items need to be processed (block 616). If more items need to be processed, then the call center directs the subscriber's call to block 612 to process the call and to determine if the call should be intercepted. If no more items need to be processed, then the subscriber's call ends (block 618).

If the mobile device 100 determines that the subscriber's call should be intercepted at block 612, then the call, along with access information required to route a message to the mobile device, is directed to the mobile device application running on the subscriber's mobile device (block 620). In one embodiment, the mobile device could play sounds or show a dialog on the display to indicate that a call has been intercepted. The mobile device application routes a signaling message, indicating that the subscriber's call has been intercepted, to the customer support call center via network signaling technologies such as SMS or USSD, and may receive a response message back. In block 628, the mobile device 100 receives and processes any signaling message from the mobile device application. The mobile device may also receive certain customer self-support data from the network. In block 622, a customer support session begins on the subscriber's mobile device using locally stored data received from the mobile device application. The mobile device may use a variety of technologies to display and respond to the customer support issue in question. In block 624, the mobile device addresses the subscriber's support issue locally, as described below. In an alternative embodiment, the mobile device retrieves data or scripts from the network to address the subscriber's support issue, as noted above (block 626).

In an alternative embodiment, the call center determines if the subscriber's call should be intercepted and directs the call accordingly. The call center may utilize an IVRS (Interactive Voice Recognition System) to communicate with the subscriber. If the call center determines that the call should not be intercepted, then the call is allowed to continue through the call center for processing (block 614). If the call center determines that the call should be intercepted, then the call is redirected back to the mobile device for local processing (block 620). Thus, if the call goes through to the call center/ IVRS, and then is routed back to the mobile device, the call to the call center may includes access information to facilitate routing a message back to the mobile device via SMS₁ USSD or other network signaling technologies. The call center employs a software application to direct mobile equipment, so that it automatically processes requests it receives from mobile devices.

In some examples, the system may be utilized to handle information or "411" calls. In these examples, the mobile device may intercept a 411 call and provide options to the user, such as a list of previously requested numbers (with or without associated information associated with these numbers), options to access information via commonly or recently accessed web pages, and so forth.

Figures 7A, 7B, 7C:
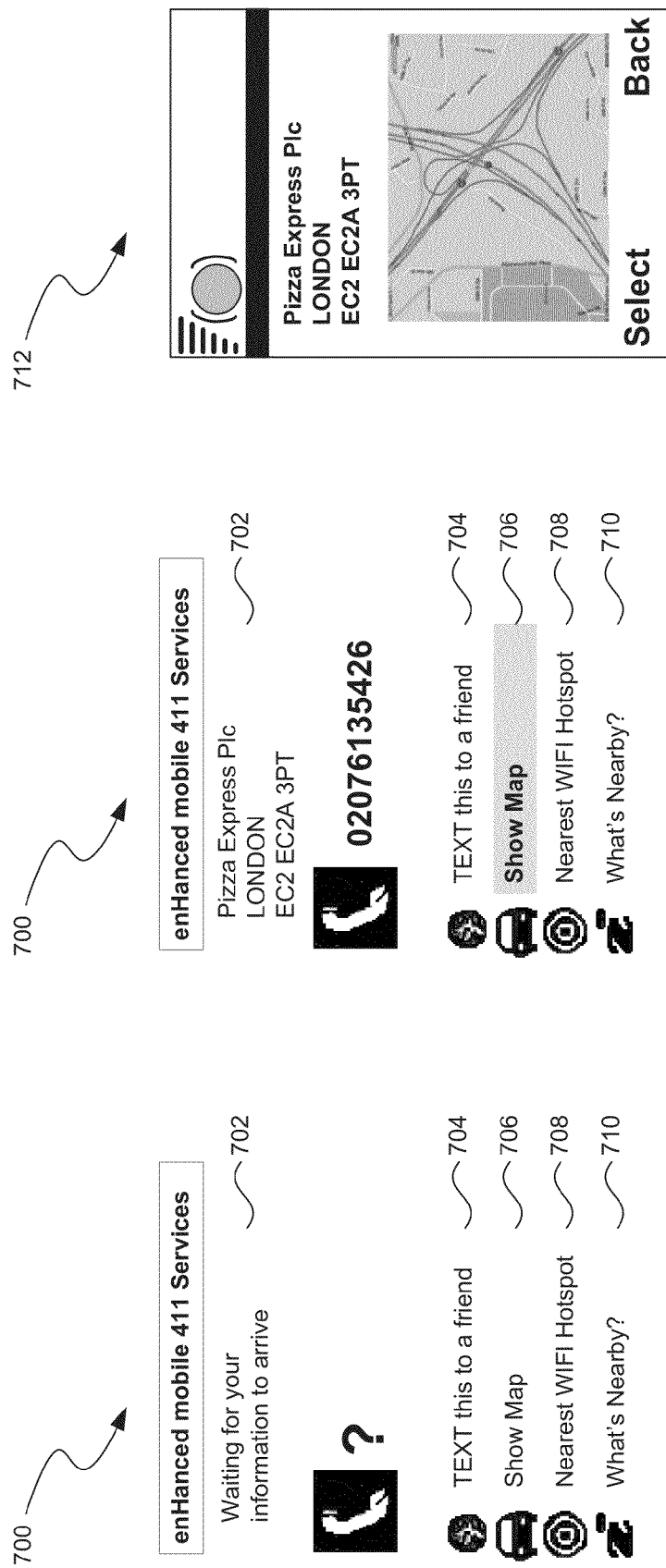
FIGS. 7A through 7C show an example of providing local customer support for information calls.

FIGS. 7A through 7C show an example of providing local customer support for information calls. As shown in FIG. 7A, the customer dials a number for requesting information, such as "411," and in response the mobile device displays a screen such as screen 700. The screen 700 includes an information portion 702 that indicates the status of the call, which in this case is that the subscriber is awaiting information from the service provider. The screen also shows options available to the customer once the desired information is obtained, such as sending received information to a friend via a text message 704, showing a map of a location associated with the retrieved information 706, identifying the nearest wireless access point or WiFi hotspot 708, or identifying what commercial establishments or points of interest are nearby 710. Since a script for providing the functionality shown is resident on the mobile device, the user may see the options available before the requested information is received.

In response to the subscriber's 411 call, the wireless service provider may provide back information to be displayed on the subscriber's phone, such as that shown in upper portion 702 in FIG. 7B. The wireless service provider may also provide detailed information, such as links to one or more web pages associated with the requested information, or specific information that needs to be displayed on the mobile device based on the options provided, such as providing to the mobile device a map of the requested information. In this example, the subscriber selects to view the map (via option 706), and the now locally stored map may be shown on the mobile device, as shown in FIG. 7C. The mobile device launches any appropriate device application to display or access data. In the example of FIG. 7C, the mobile device launches a web browser to display the map. In some examples, the system may be utilized to handle directory assistance calls. In these examples, the mobile device may intercept a directory assistance call and provide options to the user, such as a list of previously requested contacts (with or without associated information associated with these contacts), options to access information via commonly or recently accessed contacts, and so forth.

Figures 8A, 8B, 8C:
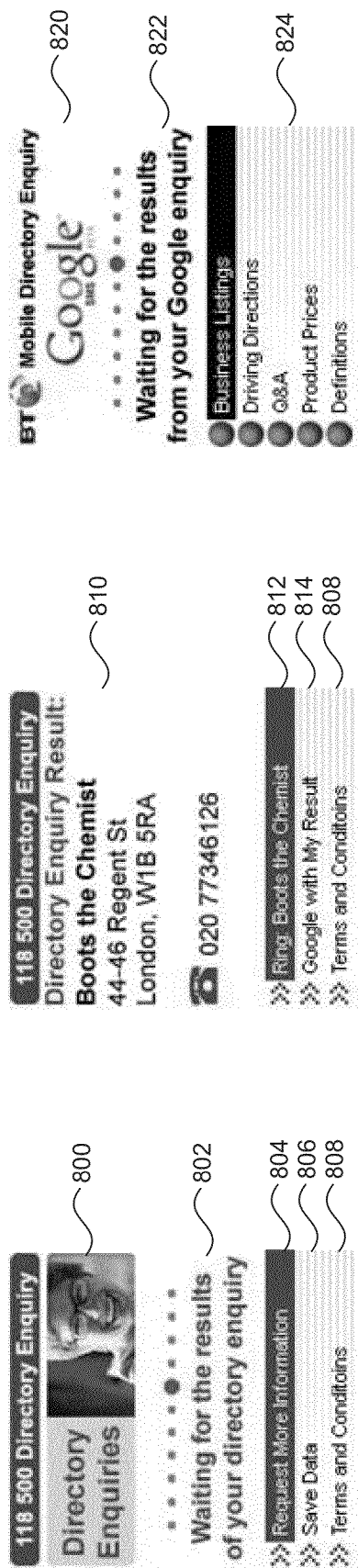
FIGS. 8A through 8C show an example of providing local customer support for directory enquiries.

FIGS. 8A through 8C show an example of providing local customer support for directory enquiries. As shown in FIG. 8A, the customer dials a number for to request information, such as "118," "118 500," "192," and so on, and in response the mobile device displays a screen such as screen 800. The screen 800 includes an information portion 802 that indicates the status of the call, which in this case is that the subscriber is awaiting results of a directory enquiry. The screen also shows options available to the customer once the desired information is obtained, such as requesting more information 804, saving the data 806, or viewing the terms and conditions 808. Since a script for providing the functionality shown is resident on the mobile device, the user may see some or all of the available options before the requested information is received.

In response to the customer's enquiry, the call center may provide back information to be displayed on the customer's phone, such as that shown in upper portion 810 in FIG. 8B. As also shown, the screen may show further options once connected, such as an option to call the found contact 812, or to search for more information regarding the found contact 814 using a search platform such as Google's "My Result.", A service provider may partner with a search engine service, such as Google's "My Result" service or Orange's "PocketThis" service. FIG. 8C shows an example of utilizing such a service after a customer selects Google with my result 814. Upon selection, the system presents screen 820 that may contain an information portion 822 that indicates the status of the call or further options 824 available to the customer, such as paths to other available information of interest. The wireless service provider may send an SMS to the phone after the call, offering extended services, such as those as shown.

Figure 9:
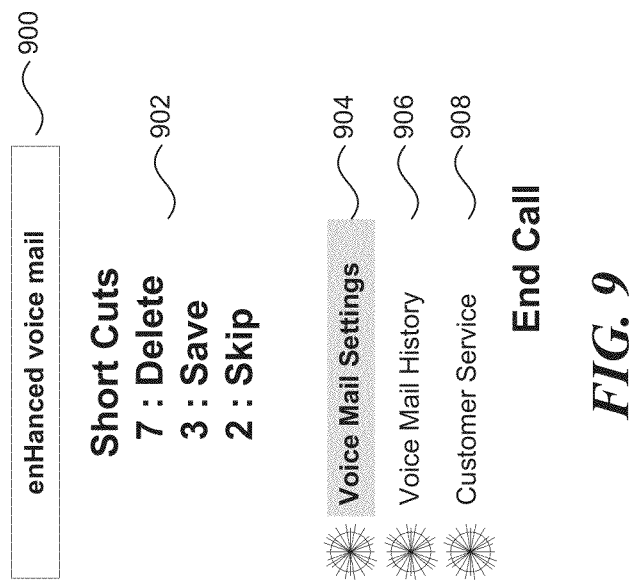
FIG. 9 shows an example of providing local customer support to a user before or during voicemail calls.
Figures 10A, 10B:
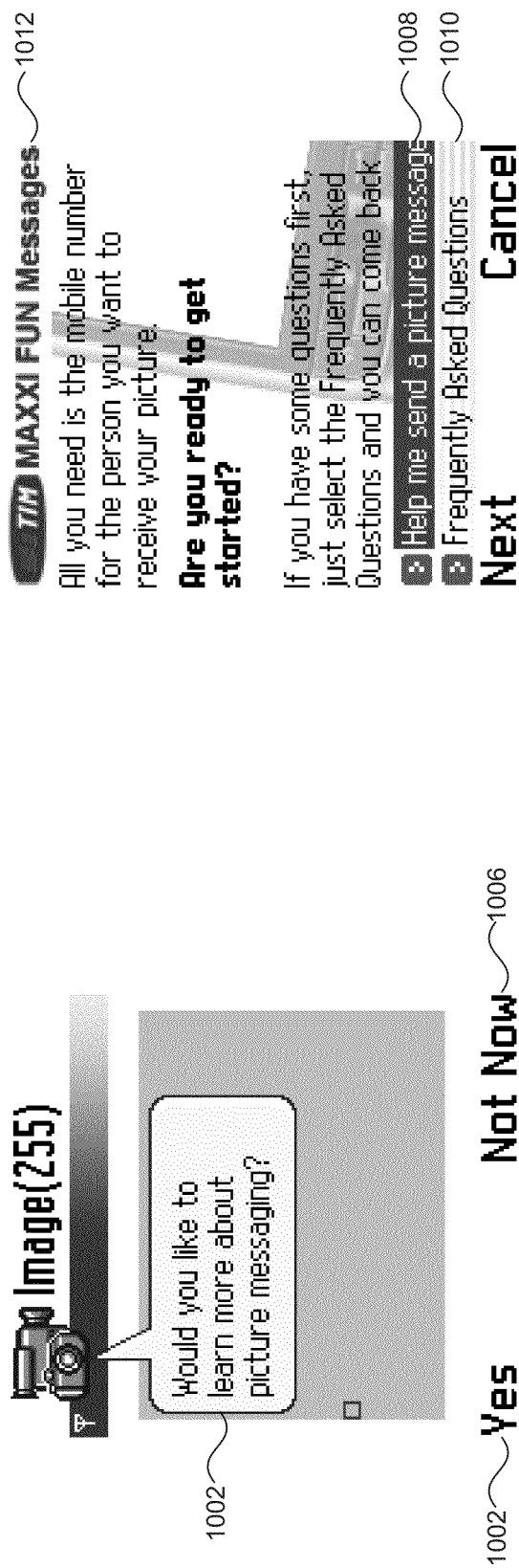
FIGS. 10A through 10D are examples of tutorials or guides that instruct users in using applications or functions on their mobile devices.
Figure 10D:
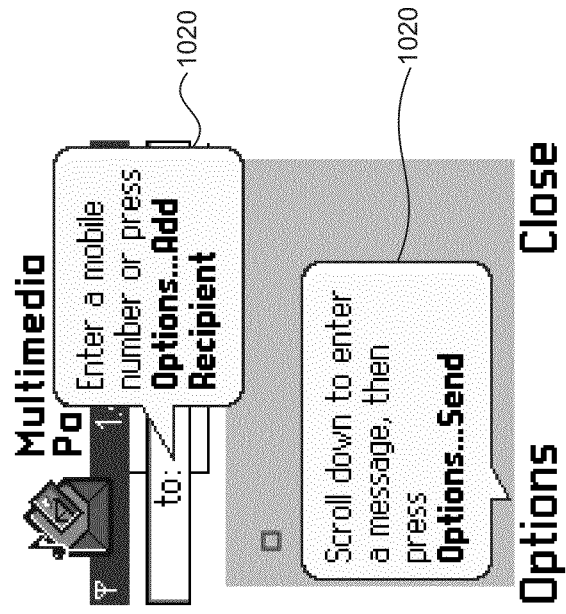
Figure 10C:
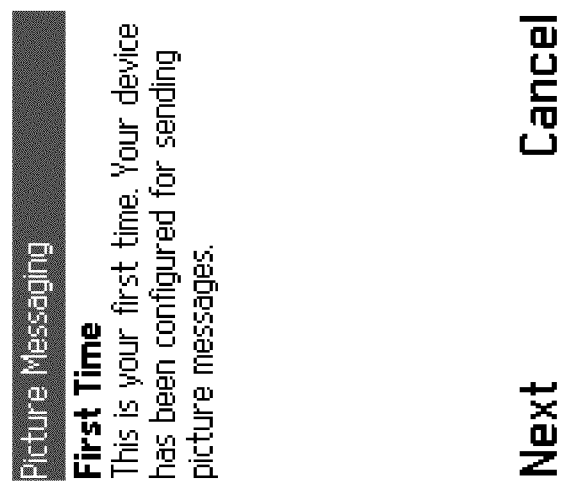

FIG. 9 shows an example of providing local customer support to a user before or during voicemail calls. For example, the user calls to his/her voicemail account (such as by pressing and holding the "1" button). Substantially simultaneously, a help screen 900, as shown in FIG. 9, pops up to display helpful information, such as short cuts 902 for navigating the voicemail system. The screen may also display options or links to access other information, such as a link to access voicemail settings 904, a link to access voicemail history 906, as well as a link to access customer service 908. In this example, the call to voicemail is not interrupted, instead the user experience on the mobile device is enhanced by providing local customer support during the call. Thus, the user interface on the mobile device provides a richer experience and more ease of use to the user.

In some embodiments, providing localized customer support involves the use of tutorials or guides to instruct subscribers in using applications or functions on their mobile devices. When a subscriber launches an application on their mobile device for the first time, the mobile device may be able to detect this first time usage. The mobile device may then locally launch an automated training tutorial that addresses the context of the application or situation. The tutorials serve to guide the subscriber along and include a set, of instructions. In addition, the mobile device may automatically collect configuration or setup data from the subscriber to deliver automated, context-sensitive tutorials and guides at relevant times. Alternatively or additionally, the mobile device may retrieve training tutorials or guides from the network, or the use of automated, context-sensitive training tutorials in one application or service may key automated training in another application or service. Results of the training tutorials may be logged for offline analysis. Further, rather than just providing the tutorial functionality the first time, the mobile device can monitor usage of device functions and initiate the tutorial functionality after a predetermined period of time has elapsed (e.g. three months). After the predetermined time, the mobile device may assume that the subscriber has forgotten how to perform the desired function and therefore again provides the tutorial functionality. Alternatively or additionally, the mobile device may provide a tutorial after a preset number of times. For example, if a subscriber has taken three pictures and has not emailed or otherwise sent any photo messages, then the mobile device launches a tutorial regarding how to send photos via the mobile device (or provides an indication to the subscriber asking whether he or she would like to view the tutorial).

FIGS. 10A through 10D are examples of tutorials or guides that instruct users in using applications or functions on their mobile devices. In some examples, software on the phone monitors events and pop up information in context with previously detected events. This teaches people how to use products/services in context while they are attempting to use those products/services. For example, as shown in FIGS. 10A-10D, a user takes a photo with his/her camera phone. The software detects the new photo and pops up an information bubble 1002 on the screen asking her if she knows that she could send the photo to friends or family (known as picture messaging). The software could also wait for three photos to be taken or notice than none of them had been sent, which may indicate that the user is not aware of or does not know how to use picture messaging. If the user elects to proceed with learning about the picture messaging feature, such as by selecting the "yes" button 1004, the software begins the tutorial, which may be a series of step by step instructions overlaid with the native application. If the user does not elect to proceed, such as by selecting the not now button 1006, the device reverts back to its previous mode.

Upon receiving the "yes" selection, the tutorial may present options to begin, such as by asking the user if he/she would like interactive help 1008 or would like to review "frequently asked questions" 1010. Additionally, the tutorial may display marketing information 1012, such as information related to the service provider's services or other sponsored services.

In some cases, the tutorial may help the user to configure the device and/or user's account. For example, FIG. 10C displays an example of a user or device configuration of "picture messaging." In some cases, the tutorial provides information, such as step by step instructions, on how to use the capabilities of services provided by the device and/or service provider. For example, FIG. 10D displays an example of help balloons 1020 that provide instructions to assist a user in sending a picture via the "picture messaging" service. In this embodiment, locally stored scripts provide contextual training, marketing, or both.

Figure 11:
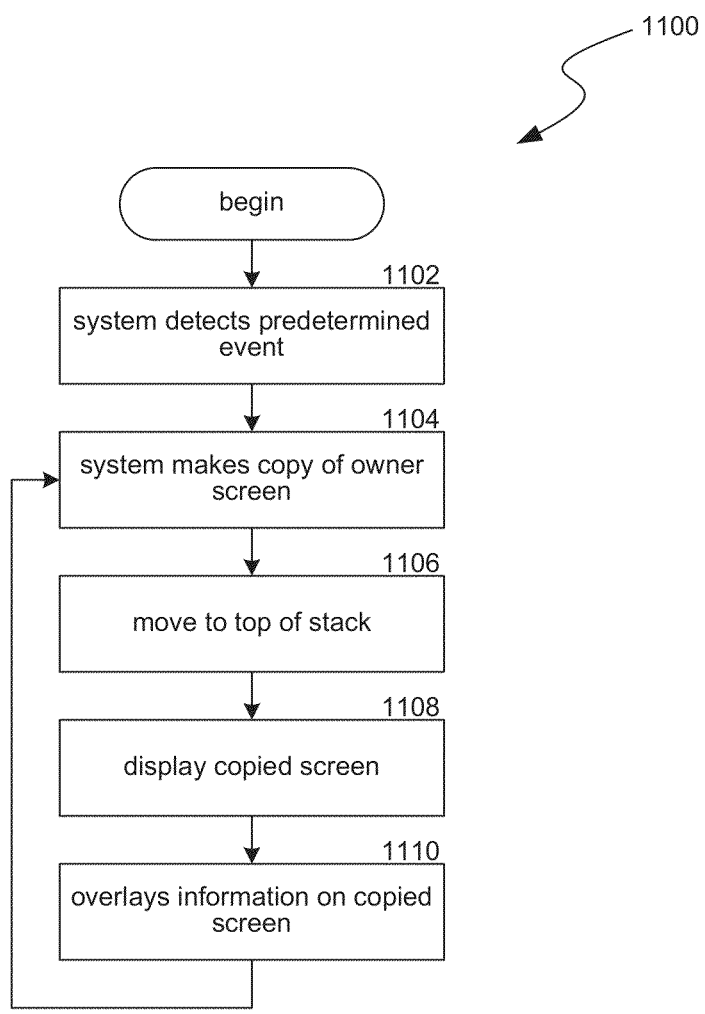
FIG. 11 is a flow diagram illustrating a routine for displaying a tutorial screen over a user selected application based upon a recognized event.

The tutorial software creates a single process flow that can interact with a variety of manufacturer's picture messaging products. FIG. 11 shows an example process flow as a routine 1100 for displaying a tutorial screen over a user selected application based upon a recognized event. In some cases, the application runs in the background on the mobile phone, waiting for specific system events. For example, in step 1102, the system detects a need to provide contextual information for another application via the detection of predetermined system events (such as a photo being taken combined with an image being saved, an initial text message received combined with a reply indication, and so on). In step 1104, the system makes a copy of a screen buffer (the current image on the screen). In step 1106, the system moves the application to the top of an application stack in the phone. In step 1108, the system displays the copied image as the tutorial's main screen. This gives the appearance that the previous application (e.g. the picture messaging application) is still on top of the application stack. The system may also compare portions of the screen to verify that it is in an expected state. An image hashing comparison, discussed in greater detail with respect to FIG. 12, may be used for the comparison. For example, portions of the screen indicating activity of the camera application could be verified to be present. In the comparison, hash values may be stored to facilitate the comparison. These values are small is storage size and therefore the system may perform the comparison without expending a lot of the mobile device's resources.

In step 1110, the system places the information that it wants to display (e.g. text bubble) on top of the copy of the previous application and processes user input and other events (e.g., received input from a user via a manual keypad) as needed. Looping back to step 1104, the system may update the display as needed to maintain the illusion of the previous application still being active and provide the desired information. When finished, the system moves the application off the top of the application stack, effectively handing control back to the previous application. All or part of routine 1100 may be repeated as needed to present step by step instructions or additional tutorial screens.

Although the above example relates to using guide or tutorial applications with "picture messaging" applications, the system may use the guide or tutorial applications described above with other mobile device applications (or "functions" or "services"). Table 1 presents a number of examples of these mobile device applications, although others may be used with the system:

Example 1: Picture Sharing Service Adoption: Subscriber is Willing to Learn More About Picture Sharing
The subscriber has taken three pictures but has not sent an MMS message. The operator wants to suggest to the subscriber that they learn how to send an MMS, and makes such a suggestion via a subtle pop-up display after taking their third picture. The subscriber expresses interest in learning more about picture sharing and the system then presents workflow that both ensures the proper configuration of MMS, and provides step-by-step instructions to the subscriber while they compose and send their first MMS message (or use another photo based service).
Example 2: Contact List Backup Service Adoption: Subscriber is Willing to Learn More About How to Protect Their Contact List
The subscriber has created ten contacts on their phone. The operator wants to suggest to the subscriber that they learn how to back up their contact list over the air or network, and makes such as suggestion via a subtle pop-up display after the user creates the 10th contact on their mobile phone. The subscriber expresses interest in learning more about the contact backup service and the system presents workflow that both ensures the proper configuration of a contact backup service (such as "SyncML"), and provides step-by-step instructions to the subscriber while they register for and configure the service.
Example 3: Data Modem Service Adoption: Subscriber is Willing to Learn More About How to Use their Phone as a Modem to Wirelessly Connect a Laptop to a Network
The system repeatedly views the same Bluetooth device in range of a Bluetooth-enabled phone capable of being used as a data modem. The operator wants to suggest that the subscriber use their phone as a means to connect their laptop to a wireless network. While interacting with phone menus related to Bluetooth, a subtle pop-up display asks the subscriber if the recognized device should be configured to use the phone as a data modem. The subscriber expresses interest in learning more about the data service and
the system presents workflow that both ensures the proper configuration of the service,
and provides step-by-step instructions to the subscriber while they register and configure
the service.
Example 4: Text Messaging Service Upgrade: Subscriber is Willing to Learn More
about Offers that May Save Them Money on Text Messaging
When the subscriber views their usage and billing information via an application such as
"SelfService Care," the number of text messages sent during the period is captured and
used to create an event. The operator wants to suggest to the subscriber that a text
messaging bundle (or subscription) might save them money over paying for text messages
on a per-use basis. While viewing their usage and billing information, a subtle pop-up
display promotes the appropriate text messaging bundle to the subscriber. The subscriber
expresses an interest in learning more about the offer and the system presents workflow
that provides additional information and allows them to subscribe to the service or
package.
Example 5: Contract Renewal Promotion: Subscriber is Willing to Learn More About
Discounted Equipment Upgrades
When the subscriber views their usage and billing information via "SelfService Care" the
date of their post-paid contract expiration is captured and used to create an event. The
operator wants to suggest to the subscriber that they should renew their post-paid contract
in return for discounted equipment or other offers. While viewing their usage and billing
information, a subtle pop-up display promotes the appropriate contract renewal to the
subscriber. The subscriber expresses an interest in learning more about the offer and the
system presents workflow that provides additional information and allows them to renew
their contract and accept the equipment upgrade (or other) offer.
Example 6: Sell Ringback Tone: Subscriber is Willing to Learn More About Ringback
Tones
When the subscriber receives more than five calls a day from the same caller the system
creates an event. The operator wants to suggest to the subscriber that they should
consider adding a ringback tone for that caller. After receiving the fifth call from the same
caller, a subtle pop-up display promotes the ringback tone service to the subscriber. The
subscriber expresses an interest in learning more about the offer and the system presents
workflow that provides additional information and allows them to select and configure a
ringback tone.
Example 7: Mobile Email Service Upgrade: Subscriber is Willing to Learn More
About Mobile Email Offers
When the subscriber sends more than 20 text messages from an email-enabled device
within a calendar month this fact is noted. The operator wants to suggest to owners of
email-enabled devices that are not subscribed to mobile email, but are active text
messaging users, that they should consider upgrading their service to include a
subscription to a mobile email service. Immediately following selecting SEND (or
equivalent) on the qualifying message (as per above conditions), a subtle pop-up display
promotes the applicable mobile email services to the subscriber. The subscriber
expresses interest in learning more about the offer and the system presents workflow that
provides additional information and allows them to select and configure a mobile email
service, automatically downloading any additional email client applications as necessary.
Alternatively, there may be a handset-based event upon which to base the promotion: A
subscriber receives multiple text messages from a users with a FROM address in email
format (user@domain).
Example 8: Mobile Instant Messaging Service Upgrade: Subscriber is Willing to
Learn More About Mobile Instant Messaging Offers
When the subscriber receives more than 10 text messages from senders with FROM
addresses identifying the messages as being delivered via an Instant Messaging Service
within a calendar month, this fact is noted. The operator wants to suggest to owners of IM-
enabled devices that are no subscribed to mobile email, but are active text messaging
users, that they should consider upgrading their service to include a subscription to a
mobile IM service. Immediately following reading the qualifying message (as per above
conditions), a subtle pop-up display promotes the applicable mobile IM services to the
subscriber. The subscriber expresses an interest in learning more about the offer and the
system presents workflow that provides additional information and allows them to select
and configure a mobile IM service, automatically downloading any additional email client
applications as necessary.
Example 9: Sell Premium Ringtone: Subscriber is Willing to Learn More About
Premium Ringtone Offers
When the subscriber changes their default ringtone two times, this fact is noted. The
operator wants to suggest to the subscriber that they should consider purchasing a
premium ringtone. After changing the ringtone for the second time, a subtle pop-up
display promotes the premium ringtones to the subscriber. The subscriber expresses an
interest in learning more about the offer and the system presents workflow that provides
additional information and allows them to purchase and configure a premium ringtone.
Alternatively, the operator may base the promotion on other events such as:
A subscriber receives multiple calls from the same person over a designated period of time
(premium ringtone per person promotion). And the Pop-up occurs after receipt of
qualifying call, or
A subscriber downloads music multiple times on a capable phone, but has not purchased
a premium ringtone.
Example 10: Speed Dial Assignment: Subscriber is Prompted to Assign Speed Dial
Entries to Frequently Called Phone Numbers -continued When the subscriber calls the same number more than 10 times in a week, this fact is noted. The operator wants to suggest to the subscriber that they should consider configuring a speed dial entry for that number. Immediately after ending the fifth qualifying call, a subtle pop-up display promotes the speed dial feature to the subscriber. The subscriber expresses an interest in using the feature and the system presents workflow that allows them to assign speed dial entry for the qualifying number.
Example 11: Sell Downloadable Game: Subscriber is Willing to Learn More About Premium Game Offers
When the subscriber plays an embedded game 5 times in a week this fact is noted. The operator wants to suggest to owners of downloadable game-enabled devices that have not downloaded a mobile game, but are active embedded game players, that they should consider downloading a premium game from the operator's portal, Immediately concluding game play of the qualifying game (as per above conditions), a subtle pop-up display promotes the applicable premium mobile game to the subscriber (genre selected based on demographics or promotion). The subscriber expresses an interest in learning more about the offer and the system presents workflow that provides additional information and allows them to select and configure a mobile email service, automatically downloading any additional email client applications as necessary.
Example 12: Sell Mobile TV Service Upgrade: Subscriber is Willing to Learn More about Mobile TV Offers
When the subscriber engages in 5 WAP (or Internet) browser sessions over a one week period this fact is noted. The operator wants to suggest to owners of Mobile TV-enabled devices that are not subscribed to mobile TV, but are active browser users, that they should consider upgrading their service to include a subscription to a mobile TV service. Immediately after concluding the qualifying browser session (as per above conditions), a subtle pop-up display promotes the applicable mobile TV services to the subscriber. The subscriber expresses an interest in learning more about the offer and the system presents workflow that provides additional information and allows them to select and configure a mobile TV subscription, automatically downloading any additional client applications as necessary. Alternatively, the promotion may be based on a subscriber regularly receiving WAP or text push content to their mobile TV-enabled phone, but they have not subscribed to a mobile TV service.
Example 13: Sell Music Download Service: Subscriber is Willing to Learn More about Music Download Offers
When the subscriber engages in 2 premium ringtone purchases over a 2 month period this fact is noted. The operator wants to suggest to owners of music download-enabled devices that have not purchased or subscribed to a music download service but are active premium ringtone users, that they should consider upgrading their service to include a subscription to a music download service, or that they should consider purchasing an individual music download. Immediately after concluding the qualifying browser session (as per above conditions), a subtle pop-up display promotes the applicable music download services to the subscriber. The subscriber expresses an interest in learning more about the offer and the system presents workflow that provides additional information and allows them to select and configure a music download subscription or individual music download, automatically downloading any additional client applications as necessary. Alternatively, the promotion may be based on a subscriber regularly receiving WAP or text push content to their music download-enabled phone, but they have not subscribed to a music download service or made and individual purchase or a subscriber regularly viewing content via WAP or Internet browser on their music download-enabled phone, but they not subscribed to a music download service or made and individual purchase.
Example 14: Sell Directory Assistance Bundle: Subscriber is Willing to Learn More About Saving Money on Directory Assistance Calls
When the subscriber calls directory assistance (e.g. 411) 3 times in a month this fact is noted. The operator wants to suggest to frequent users of directory assistance that they could save money by purchasing a directory assistance bundle (monthly recurring charge, or pack). Immediately concluding of the qualifying call to directory assistance (as per above conditions), a subtle pop-up display promotes the applicable directory assistance bundle to the subscriber. The subscriber expresses an interest in learning more about the offer and the system presents workflow that provides additional information and allows them to select and purchase a directory assistance bundle.
Example 15: Mobile Search Promotion: Subscriber is Willing to Learn More About Mobile Search
When the subscriber engages in 5 WAP (or Internet) browser sessions over a one week period this fact is noted. The operator wants to suggest to owners of Mobile TV-enabled devices that have not used an embedded mobile search application, but are active browser users, that they should consider using the embedded search capability that came with their mobile phone. Immediately after concluding the qualifying browser session (as per above conditions), a subtle pop-up display promotes the applicable mobile search service to the subscriber. The subscriber expresses an interest in learning more about the offer and the system presents workflow that provides additional information and allows them to select and configure a mobile search, automatically downloading any additional client applications as necessary.
Example 16: Out of Box Experience: Subscriber is Willing to Learn More About the Capabilities of Their New Mobile Phone
When the subscriber turns on their mobile phone for the first time, this fact is noted. The operator wants to provide a welcome experience to the subscriber, orienting them with applicable network services, optional upgrades that may be available on their device. Immediately after booting, a full-screen user-interface is displayed that includes several tutorials and configuration tools that will orient the subscriber with the basic features of -continued their mobile phone, as well as present options relative to upgrades, accessories, and downloadable applications. A menu item is selected that presents information and workflow to the subscriber designed to register the subscriber on the operator's "my account" website, which will enable capabilities such as reviewing usage, making payments, and adding new services to their subscription. Alternatively, the following capabilities may be included: Subscriber makes menu selection and the system presents information and workflow allowing them to configure and/or subscribe to voicemail, mobile TV, mobile IM, mobile email, and/or music download services.
Example 17: Sell Wi-Fi Data Service: Subscriber is Willing to Learn More About Wi-Fi Data Offers
When the subscriber accesses mobile data network services (e.g. GRPS, UMTS, IxEV-DO) from a Wi-Fi capable mobile phone this fact is noted. The operator wants to suggest to owners of Wi-Fi-enabled devices that have not subscribed to or configured a Wi-Fi data service, but are active mobile data network users (as identified by WAP or Internet browser usage), and they are using such data services Thorn a capable Wi-Fi hotspot, that they should consider using the embedded Wi-Fi data capability that came with their mobile phone. Immediately after beginning the qualifying browser session (as per above conditions), a subtle pop-up display promotes the Wi-Fi data service to the subscriber. The subscriber expresses an interest in learning more about the offer and the system presents workflow that provides additional information and allows them to select and configure Wi-Fi data service, automatically downloading any additional client applications as necessary.
Example 18: Sell Wi-Fi VoIP Service: Subscriber is Willing to Learn More About Wi-Fi Calling Offers
When the subscriber is within range of a VoIP capable Wi-Fi hotspot for more than 15 minutes (public, private enterprise-based, or home-based), this fact is noted, The operator wants to suggest to owners of UMA/Wi-Fi VoIP-enabled devices that have not subscribed to or configured a Wi-Fi VoIP data service, but are within range of an appropriate Wi-Fi hotspot (for at least 15 minutes), and they are using such data services Thorn a capable Wi-Fi hotspot, that they should consider using the embedded Wi-Fi VoIP capability that came with their mobile phone. Immediately after beginning to interact with the device keyboard (as per above conditions), a subtle pop-up display promotes the Wi-Fi VoIP service to the subscriber. The subscriber expresses an interest in learning more about the offer and the system presents workflow that provides additional information and allows them to select and configure Wi-Fi VoIP service, automatically downloading any additional client applications as necessary.
Example 19: Top-Up Prepaid: Subscriber is Prompted to Top-Up Their Prepaid Account
Prepaid balance update messages delivered via MT SMS (or USSD, WAP Push) are intercepted by "SelfService Guide," and when a low-balance threshold message is received by the subscriber, this fact is noted. The operator wants to remind subscribers of their low-balance status and prompt the subscriber to top-up their prepaid account. Immediately following the next phone call terminated after receiving the low-balance threshold message, the subscriber is alerted to their low-balance threshold via a lull-screen display and brief audio alert. The subscriber makes a menu selection and engages in workflow to purchase a $50 top-up, and engages in any registration necessary to complete the process (e.g. if the subscriber has not registered for online top-up and supplied a credit/debit card). Alternatively, the subtle pop-up occurs after pressing SEND on the qualifying call.
Promote Day/Date Specific Equipment Upgrade Offer: Subscriber is Willing to Learn More About Special Upgrade Offer
Example 20: Promote Day/Date Specific Equipment Upgrade Offer: Subscriber is Willing to Learn More About Special Upgrade Offer
The subscriber's post-paid (pay monthly) contract is about to expire, and under the terms of the contract has opted-in to receive reminders regarding renewal. The operator wants to suggest to the subscriber that they should renew their post-paid contract in return for discounted equipment or other offers, 14 days before the contract expires, the subscriber receives a subtle pop-up message when interacting with the keyboard for the first time on that day. The subscriber continues without engaging the offer. 7 days before the contract expires, the subscriber receives a full-screen display and audio alert immediately after terminating their next phone call. The subscriber expresses an interest in learning more about the offer and the system presents with workflow that provides additional information and allows them to renew their contract and accept the equipment upgrade (or other) offer.

The guide or tutorial applications described herein detect user inputs, but may also launch based on historical or other evaluations. In some cases, the guide asks users context based questions to facilitate the user of a certain or selection function or service of the mobile device.

The customer self-support and other features described herein are not limited to mobile devices, as noted above. Such features can apply to any remote device, including consumer appliances such as refrigerators, dishwashers, washers/dryers, ovens, and so forth. With any of such appliances having computing capabilities (and/or connection to the internet), such devices can locally store information and provide the functionality described above to handle customer inquiries that previously had been handled by a call center or web site accessed by the consumer via another device, such as the consumers computer.

Thus, in an alternate embodiment, a mobile device may use a Bluetooth or other wireless protocol link to communicate with the household appliances. For example, a Bluetooth link between a refrigerator and a mobile device may allow the mobile device to automatically detect a drop in the temperature of the refrigerator. Upon automatic detection, the mobile device may alert the user regarding the drop in temperature.

Using the mobile device as an interface, the user may find information to address the drop in temperature on the mobile device itself, may download information from a network, or may call a customer support center for the specific appliance.

As noted above, each remote device may include the customer self-support functionality described herein. Further, since some remote devices may lack a sufficient display screen or other user interface, the remote device may communicate with the mobile device so that the mobile device operates as a more robust user interface for that remote device. Thus, consumers may receive instruction screens or tutorials from an appliance, and provide commands to that appliance, through the mobile device.

Alternatively, or additionally, the mobile device may locally perform diagnostic scripts on the device to gather user, device, and network data. Such scripts may be loaded over the air (OTA), and may be so loaded at any point, or initiated from a call center agent desktop computer. By either agent or mobile device initiation, diagnostic scripts on the phone are automatically initiated proactively to resolve problems encountered by the subscriber. In some embodiments, the mobile device or the call center agent can collect, via scripts, all the required information over the air without asking the subscriber.

Figure 12:
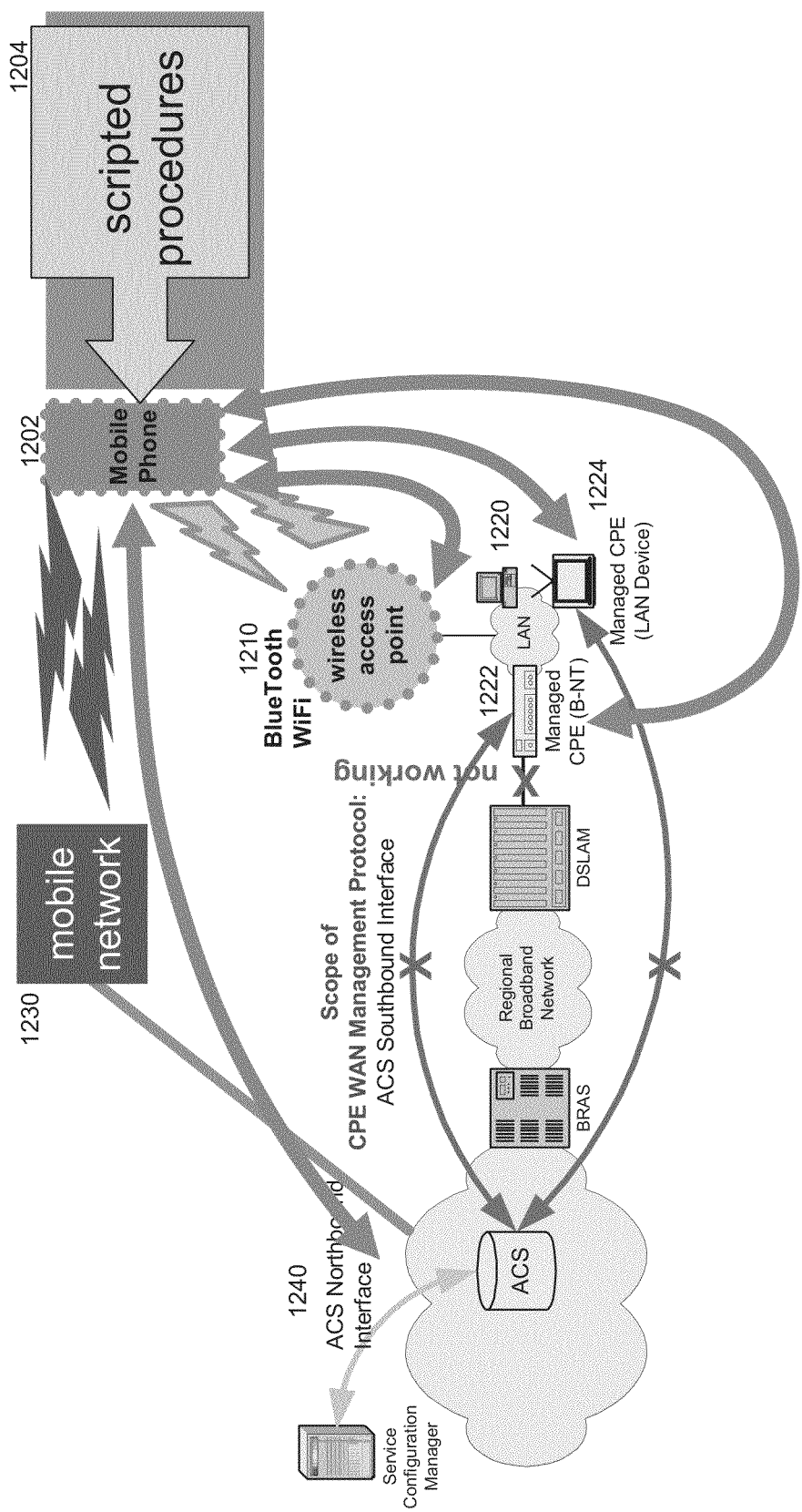
FIG. 12 is a schematic diagram of components within a mobile phone network that perform connection diagnostics on fixed wireless equipment such as customer owned WIFI access points connected to a IP network

FIG. 12 is an example of a system that allows some of the scripted procedures described above to assist in diagnosing customer premises equipment, via a mobile phone, where that mobile phone can communicate wirelessly with a local wireless access point, such as a WIFI or Bluetooth wireless link. The mobile phone can receive service inquiries and commands from a WAN or other service provider, via the cellular wireless network, and provide in return information regarding the status and configuration of a computer or other components connected to the wireless access point. For example, if a user can't connect to the network, the service provider would have to determine configurations of components at the customer's premise via fixed connections to help determine whether the problem was local or whether it was some place within the network. However, using scripts within a mobile device, the system enables a service provider to query the system from both ends towards the middle, and the service provider toward the network, and from the customer's premises and wireless access point toward the network.

For example, FIG. 12 shows a block diagram of components within a mobile phone network to perform connection diagnostics on fixed wireless equipment such as customer owned WIFI access points connected to a IP network. Mobile device 1202, which contains scripted procedures 1204, may access customer premises equipment at a number of points, including connections to a wireless access point 1210, or to some or all of the devices 1220, 1222, and/or 1224 themselves. Using the mobile network associated with the device 1202, the customer premises equipment can then access service provider equipment 1240 to query the system and continue the diagnosis.

In some cases, diagnostics are remotely initiated by a customer care agent or an automated diagnostic system. In these cases, the diagnostics are initiated when a network management system loses connectivity, when a subscriber contacts a customer service agent and indicates that the system is not working, when the mobile device attempts to make a connection for voice over IP (VOIP) calling and the connection does no work, and so on. Additionally, the system may perform the scripted procedures with or without subscriber interaction.

In some cases, the scripts on the mobile device may be modified and updated based on information acquired post customer premises equipment (CPE) linking. Scripts may be server based or locally cached, or combinations of locally cached and server based. Scripts may be used to configure routers, access points (Bluetooth, WIFI, etc), and so on. Additionally, the chain of equipment may be analyzed and problems may be diagnosed from both ends of the wired (and/or wireless) network.

In some cases, the system provides scripted procedures to determine the "wireless detection of and "wireless link-activation to" wireless access points for convergent fixed-line and mobile telecommunications handsets. In these cases, the mobile phone recognizes an access point locally by trying to make a connection from the mobile phone back to an ACS or network connection. The mobile phone performs local analysis of access points to determine whether the phone can, for example, connect to the PSTN. The phone sniffs for useable networks and alerts the user when a useable network is identified. The phone can then query the user as to whether to connect to the newly identified network so as to route calls through the PSTN via this new access point. The phone can thus perform a diagnostic on the connection to see if that connection to the network at this newly discovered access point is sufficient to provide the service that the user requests. The phone may include business rules identifying the services that the user wishes from access points.

In some cases, the methods described above enable the mobile device to build LAN connections to customer equipment when a WAN between the equipment and a network is not working. The LAN connections enable diagnostics to be performed by an operator or other entities related to the equipment (suppliers, etc.). The system manages the diagnostic connections via the scripts described above.

In some embodiments, the system provides for an accurate interaction between a user of a mobile device and customer service support. FIGS. 13A and 13B show a method for efficient digital comparison of visually displayed information. In these examples, the system provides a hash or unique number on a portion of a screen displayed on the user's mobile phone with a similar hash to see if the mobile device is "on the same page" as an expected "page" or on the same page as a customer service person following along with a user of the device in order to provide support to the user.

In some embodiments, the system uses the above comparison to verify that an application running on the mobile device is in an expected state. Hash values for an expected screen state may be precalculated and saved to the device. For example, If a running guide application determines that the state of the device is not as expected (such as the user takes an incoming call while in the middle of the guide application) then the guide application may close (that is, the guide application gets out of the users way.).

In some embodiments, the comparison may be between a guide application running on a customer's mobile device and a similar application running on a customer support agent's machine. Because the hash values are small, the comparison may be determined or verified with a minimum of network traffic. Looking at FIG. 13A, the system may select a target pixel region 1302 in a visual display field 1300 of a rasterized image for comparison (such as a display field on a customer's device). The system may then save off the coordinates of the selected area (REGION). The system may then hash the selected raster pixels (such as an RGB (red-blue-green) value per pixel) of the selected area using a one-way hashing function, such as MD5, to determine a first hash value. The system then saves the resulting hash value (Hash1). Only a small hash value needs to be transmitted to or cached on the mobile device for evaluation, and not, for example, the entire display field. The MD5 hash algorithm, for example, gives an output of only 128 bits (16 bytes). Although the MD5 hash algorithm is used in this example, other suitable hash algorithms are possible.

Optionally or additionally, other data storage formats for representing an image region may be used in the comparison described above, although the format compares hash values should be similarly formatted (For example, if a baseline image format being hashed is RGB, band interleaved by pixel (BIP), and 8 bits per sample, then the comparison image should not be in band sequential format (BSQ), or band interleaved by line format (BIL), any non-RGB colorspace, or any bits per sample other than 8 for all bands).

At the customer support side, the system performs similar steps in order to compare the two. The system may select a target pixel region in the visual display field of a rasterized image based on coordinates determined in the "preparation" step (REGION). The system may then hash the selected raster pixels such as an RGB value per pixel) of the selected area using a one-way hashing function, such as MD5, to determine a second hash value (hash2).

The system may then compare the current hash value (hash2) to a previously saved hash value (hash1) to determine if the visual display is the same as previously determined, such as determining if ([REGION]Hash1=Hash2[REGION]) is true or false. This comparison could also iterate through a list of HashN value to find a match. The system may then use the true/false result to make decisions.

For example, the system may perform a remote comparison of expected and actual behavior on remote mobile devices, such as sending a hash1 value from a networked computer to a mobile phone. The mobile handset processor evaluates the image in REGION and creates a hash value (hash2) and responds back to the networked computer with the results of the comparison (or derivative of the comparison). Additionally, a list of HashN values could be sent to the device, and the index to the matching value could be returned.

As described above, the system may perform a local comparison of expected and actual behavior on mobile devices using the above detailed comparison. The pre-cached value for REGION and hash1 may be stored locally on the mobile device, and the result may be used locally.

The system may perform such comparisons of hash values to make decisions related to use of the system or effectiveness of the system. In some cases, a customer service agent may want to determine if the mobile device user followed the proper steps in a complex process. The agent may to determine if the user is in the correct state by performing the visual comparison. Also, when a complex series of tests are performed on a mobile device, and the tests involve multiple device applications, the comparison value can be used to determine that the device is in the expected state. The testing may be further enhanced by including unique visual elements in the visual display (such as a unique number) that can be used in the comparison.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Further, the mobile device may employ many other locally stored applications beyond those described above. For example, the mobile device may include its own IVR system, rather than employing an IVR system at the call center. Thus, the subscriber navigates through a series of IVR menus to access desired information, some of which may be stored on the phone. However, one option in the local IVR could be to have the device place a call to the customer support call center.

In another alternative embodiment, the system may provide links to web pages supplied by the wireless service provider, where these links are to specific web pages directly addressing a need or question relevant to a current status of a user's mobile device. Such an alternative is useful when a mobile device has a web browser and sufficient data connection to the service provider's web server. Thus, a call intercept function on the mobile device may provide a link to a relevant web page, or even access that page automatically so that it is displayed to the user (rather than, for example, displaying locally stored content).

While many embodiments described above employ software stored on the mobile device (either before being given to a subscriber, or during a subscriber call), the scripts and other software noted above may be hard coded into the mobile device (e.g. stored in EEPROM, PROM, etc.). Further, the above functionality may be implemented without scripts or other special modules.

The teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the local-based support system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method performed by a mobile device, the method comprising:
    automatically detecting, at the mobile device, one or more events from a set of events,
        wherein each event in the set of events was previously determined to correspond to a situation in which users encounter one or more problems or need additional information;
    automatically selecting, at the mobile device, one or more scripts from a database of scripts,
        wherein the database of scripts is stored locally on the mobile device,
        wherein the database of scripts includes multiple, different scripts, and
        wherein the one or more scripts are selected based upon (A) the detected one or more events and (B) a proposed solution to resolve the encountered problem or a source for the additional information; and
    locally performing, at the mobile device, an action based at least in part on the selected one or more scripts.

2. The method of claim 1, wherein the detected one or more events comprise an indication that the user is using a function of the mobile device for the first time or that a predetermined amount of time has elapsed since the user last used the function of the mobile device.

3. The method of claim 1, wherein the detected one or more events comprise receipt of a user-input phone number indicating a call to be completed to the phone number, and
    wherein the phone number matches a phone number in a set of phone numbers previously determined to be dialed in the situation in which users encounter one or more problems or need additional information.

4. The method of claim 1, wherein the detected one or more events comprise receipt of a user-input phone number indicating a call to be completed to the phone number, and
    wherein the action comprises intercepting the call for local handling on the mobile device.

5. The method of claim 1, wherein the detected one or more events comprise a call to an information service and the action comprises displaying a list of information previously requested from the information service; or
    wherein the detected one or more events comprise an access to a contacts data store and the action comprises displaying a list of previously requested contacts from the data store.

6. The method of claim 1, wherein the action comprises displaying marketing information related to the detected one or more events.

7. The method of claim 1, wherein the one or more scripts are capable of at least one of 1) providing customer care to a subscriber on the mobile device, 2) providing diagnostic tools to assist in diagnosing customer premises equipment related to a customer associated with the mobile device, 3) collecting metrics relating to the mobile device, 4) training a user to perform a task.

8. A mobile device, comprising:
    a local storage component, the local storage component containing, on the mobile device, one or more scripts,
        wherein the one or more scripts are related to a set of one or more predetermined events and the scripts are related to a proposed solution to resolve a problem or to a source for additional information;
    an event detection component configured to automatically detect one or more events from the set of events,
        wherein each event in the set of events was previously determined to correspond to a situation in which users encounter one or more problems or need additional information; and
    a launching component, the launching component configured to:
        automatically select, at the mobile device, one or more selected scripts from the local storage based on each selected script being:
            related to at least one event detected by the event detection component, or
            based on the selected script proposing a solution to resolve the encountered problem or indicating a source for the additional information; and
        invoke one or more of the selected scripts to perform an action.

9. The mobile device of claim 8, wherein the action comprises presenting a list of top issues or questions pertaining to the event.

10. The mobile device of claim 8, wherein the action comprises presenting a list of top issues or questions pertaining to the event; and
    wherein the mobile device further comprises an input device configured to receive a selection of one or more of the presented issues or questions; and
    wherein the action further comprises, in response to receiving the selection, presenting data relevant to the selected issue or question.

11. The mobile device of claim 8, wherein the action comprises executing, by the mobile device, multiple executables, and
    wherein at least one of the executables accesses and alters one or more settings on the mobile device.

12. The mobile device of claim 8, wherein the action comprises displaying marketing information related to the detected one or more events.

13. The mobile device of claim 8, wherein the event detection component is further configured to detect the one or more events by detecting an indication that the user is using a function of the mobile device for the first time or that a predetermined amount of time has elapsed since the user last used the function of the mobile device.

14. A computer-readable storage device storing instructions configured to, when executed by a computing device, cause the computing device to perform operations by a mobile device, the operations comprising:
- automatically detecting, at the mobile device, one or more events from a set of events,
  - wherein each event in the set of events was previously determined to correspond to a situation in which users encounter one or more problems or need additional information;
- automatically selecting, at the mobile device, one or more scripts from a database of scripts,
  - wherein the database of scripts is stored locally on the mobile device,
  - wherein the database of scripts includes multiple, different scripts, and
  - wherein the one or more scripts are selected based upon (A) the detected one or more events and (B) a proposed solution to resolve the encountered problem or a source for the additional information; and
- locally performing, at the mobile device, an action based at least in part on the selected one or more scripts.

15. The computer-readable storage device of claim 14, wherein the detected one or more events comprise an indication that the user is using a function of the mobile device for the first time or that a predetermined amount of time has elapsed since the user last used the function of the mobile device.

16. The computer-readable storage device of claim 14, wherein the detected one or more events comprise receipt of a dialed phone number indicating a call to be completed to the phone number, and
wherein the phone number matches a phone number in a set of phone numbers previously determined to be dialed in the situation in which users encounter one or more problems or need additional information.

17. The computer-readable storage device of claim 14, wherein the detected one or more events comprise receipt of a user-input phone number indicating a call to be completed to the phone number, and
wherein the action comprises intercepting the call for local handling on the mobile device.

18. The computer-readable storage device of claim 14, wherein the detected one or more events comprise a call to an information service and the action comprises displaying a list of information previously requested from the information service; or
wherein the detected one or more events comprise an access to a contacts data store and the action comprises displaying a list of previously requested contacts from the data store.

19. The computer-readable storage device of claim 14, wherein the action comprises displaying marketing information related to the detected one or more events.

20. The computer-readable storage device of claim 14, wherein the one or more scripts are capable of at least one of 1) providing customer care to a subscriber on the mobile device, 2) providing diagnostic tools to assist in diagnosing customer premises equipment related to a customer associated with the mobile device, 3) collecting metrics relating to the mobile device, 4) training a user to perform a task.

* * * * *